US012469430B2

(12) United States Patent
Kim et al.

(10) Patent No.: US 12,469,430 B2
(45) Date of Patent: Nov. 11, 2025

(54) DRIVER, DISPLAY DEVICE, DISPLAY SYSTEM, ELECTRONIC DEVICE, DISPLAY DRIVING METHOD, AND METHOD OF DRIVING ELECTRONIC DEVICE

(71) Applicant: SAMSUNG DISPLAY CO., LTD., Yongin-si (KR)

(72) Inventors: Su Bin Kim, Yongin-si (KR); Se Byung Chae, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 70 days.

(21) Appl. No.: 18/315,178

(22) Filed: May 10, 2023

(65) Prior Publication Data

US 2024/0013704 A1 Jan. 11, 2024

(30) Foreign Application Priority Data

Jul. 8, 2022 (KR) ........................ 10-2022-0084624

(51) Int. Cl.

*G09G 3/00* (2006.01)
*G09G 3/20* (2006.01)
*G09G 3/3233* (2016.01)

(52) U.S. Cl.

CPC ......... *G09G 3/2096* (2013.01); *G09G 3/3233* (2013.01); *G09G 2300/0819* (2013.01); *G09G 2300/0842* (2013.01); *G09G 2300/0861* (2013.01); *G09G 2320/0693* (2013.01); *G09G 2340/0435* (2013.01)

(58) Field of Classification Search

None

See application file for complete search history.

(56) References Cited

U.S. PATENT DOCUMENTS

| | | | | |
|---|---|---|---|---|
| 7,969,507 | B2 | 6/2011 | Kim | |
| 9,076,393 | B2 | 7/2015 | Kim et al. | |
| 2007/0030388 | A1 | 2/2007 | Chu et al. | |
| 2010/0283790 | A1 | 11/2010 | Yin et al. | |
| 2015/0138212 | A1 | 5/2015 | Bae et al. | |
| 2019/0392742 | A1* | 12/2019 | Muraki | G09G 3/006 |
| 2022/0114957 | A1 | 4/2022 | Lee et al. | |
| 2022/0397932 | A1 | 12/2022 | Kim et al. | |
| 2022/0399915 | A1 | 12/2022 | Kim et al. | |
| 2023/0206819 | A1* | 6/2023 | Kim | G09G 3/2096 345/698 |
| 2023/0410741 | A1* | 12/2023 | Lee | G09G 3/3233 |

FOREIGN PATENT DOCUMENTS

| | | |
|---|---|---|
| KR | 10-0747668 | 8/2007 |
| KR | 10-1350737 | 1/2014 |
| KR | 10-2022-0167848 | 12/2022 |
| KR | 10-2022-0167850 | 12/2022 |

* cited by examiner

*Primary Examiner* — Carl Adams

(74) *Attorney, Agent, or Firm* — F. CHAU & ASSOCIATES, LLC

(57) ABSTRACT

A includes a receiver and a controller. The receiver receives data through a first channel. The controller receives a first synchronization signal including a periodic signal through a second channel different from the first channel and outputs a data signal based on the data and the first synchronization signal.

24 Claims, 27 Drawing Sheets

DRIVER, DISPLAY DEVICE, DISPLAY SYSTEM, ELECTRONIC DEVICE, DISPLAY DRIVING METHOD, AND METHOD OF DRIVING ELECTRONIC DEVICE

CROSS-REFERENCE TO RELATED APPLICATION

This non-provisional patent application claims priority under 35 U.S.C. § 119 to Korean Patent Application No. 10-2022-0084624, filed on, Jul. 8, 2022, the disclosure of which is incorporated by reference in its entirety herein.

1. Technical Field

The disclosure relates to a driver, a display device, a display system, and an electronic device including the driver, a display driving method, and a method of driving the electronic device.

2. Discussion of Related Art

A display device may include a display panel, an application processor, and a display driver to drive the display panel. The display device may support a mobile industry processor interface (MIPI) standard. During a video mode of MIPI, the display driver may need to immediately display an image on the display panel based on image data received from the application processor. Thus, accurate synchronization between the display driver and the application processor is required.

The display driver may generate its own internal synchronization signal for performing the synchronization. However, when the internal synchronization signal has an error, the display driver and the application processor may become out of sync with one another, thereby reducing the quality of images displayed on the display panel.

SUMMARY

When a smartphone employs the display device, the quality of images displayed on the smartphone may be decreased when the display driver of the display device becomes out of sync with the application processor. The display driver could include a memory device to aid in synchronization, but when a memory capacity of the memory device is increased, a chip size and a manufacturing cost increase. Further, when the display driver is driven at a high-speed such as 120 Hz or more, the display device may consume a great deal of power. Moreover, when a resolution of a display panel is increased, a size of the display driver needs to be increased, which makes it more difficult to drive the display panel.

At least one object of the disclosure is to provide a display driver of which a size and a cost are reduced, and a display system including the same.

At least one object of the disclosure is to provide a display driving method to ensure synchronization between an application processor and the display driver.

Objects of the disclosure are not limited to the objects described above, and other technical objects which are not described will be clearly understood by those skilled in the art from the following description.

According to an embodiment of the disclosure, a driver includes a receiver and a controller. The receiver receives data through a first channel. The controller receives a first synchronization signal including a periodic signal through a second channel different from the first channel, and outputs a data signal based on the data and the first synchronization signal.

In an embodiment, the driver does not include any memory device for storing the data.

In an embodiment, the receiver receives the data through the first channel during a first period, and does not receive the data through the first channel during a second period, and the periodic signal toggles in both the first and second periods.

The first channel may include at least one pair of lines, and the second channel may be include a single line.

A clock signal is embedded in the data, and the first synchronization signal may be different from the clock signal recovered from the data.

The receiver may receive a clock signal through a third channel different from the first and second channels.

The first channel may include at least one pair of lines, the second channel may include a single line, and the third channel may include a pair of lines.

The controller includes a calibration circuit configured to correct an error in the first synchronization signal to generate the second synchronization signal, and the controller outputs the data signal in response to the second synchronization signal.

The calibration circuit may generate a horizontal synchronization signal by delaying pulses of the first synchronization signal using offsets determined from the offset calibration, and the horizontal synchronization signal may be included in the second synchronization signal.

The calibration circuit may generate a third synchronization signal including one pulse in one horizontal time by removing noise from the first synchronization signal or inserting a pulse through a masking operation using a masking reference signal, and generate the horizontal synchronization signal from the third synchronization signal based on the offsets.

The driver may include an oscillator for generating the masking reference signal.

The masking reference signal may have a first level in a first period and a second other level in a second other period, and the calibration circuit may generate the third synchronization signal by bypassing the first synchronization signal in the first period and masking the first synchronization signal in the second period.

The calibration circuit may generate the third synchronization signal by inserting a pulse at or after an end time point of a period in which a pulse of the first synchronization signal is not generated.

The calibration circuit may generate the horizontal synchronization signal by delaying a bypassed pulse among pulses of the third synchronization signal by a first offset and delaying an inserted pulse among the pulses of the third synchronization signal by a second offset different from the first offset.

The calibration circuit may recover an external vertical synchronization signal and an external horizontal synchronization signal from the data and generate a vertical synchronization signal by synchronizing the external vertical synchronization signal and the horizontal synchronization signal, and the vertical synchronization signal may be included in the second synchronization signal.

The calibration circuit may set the offsets based on the external horizontal synchronization signal and the third synchronization signal.

A period of the horizontal synchronization signal may be the same as an average period of the first synchronization signal.

A period of the horizontal synchronization signal may be different from an average period of the first synchronization signal.

According to an embodiment of the disclosure, a display device includes a display panel including a pixel, and a driver configured to receive data through a first channel, receive a first synchronization signal including a periodic signal through a second channel different from the first channel, and output a data signal to the display panel based on the data and the first synchronization signal.

The pixel may include a light emitting element, a driving transistor controlling a driving current flowing through the light emitting element in response to a voltage of a gate electrode, a switching transistor transmitting a data voltage to the gate electrode of the driving transistor, and an emission control transistor connected to the light emitting element in series to control an emission duty of the light emitting element, and the first synchronization signal may have a toggled waveform in a frame period in which the switching transistor does not operate and the emission control transistor operates.

According to an embodiment of the disclosure, an electronic device may include a main processor configured to output a first synchronization signal including a periodic signal and data, an auxiliary processor configured to output a data signal based on the first synchronization signal and the data, and a display configured to display an image corresponding to the data signal. The main processor is configured to set a value of a refresh rate of the image, and the main processor may output the data or stop an output of the data according to the set value of the refresh rate of the image, and continuously output the first synchronization signal.

According to an embodiment of the disclosure, a display control method includes: receiving, by a receiver of a driver, data through a first channel; receiving, by a controller of the driver, a first synchronization signal including a periodic signal; and outputting, by the driver, a data signal to a display panel based on the data and the first synchronization signal.

The outputting the data signal may include correcting an error in the first synchronization signal to generate a second synchronization signal; and outputting the data signal in response to the second synchronization signal.

According to an embodiment of the present disclosure, a method of driving an electronic device includes controlling, by an auxiliary processor, a display to display a first image based on data received from a main processor in a first driving period, and controlling, by the auxiliary processor, the display to display a second image corresponding to the first image in the first driving period based on a first synchronization signal received from the main processor in a second driving period.

Controlling the display to display the second image may include controlling the display to display the second image based on the first synchronization signal in response to the first driving period being greater than a reference blank period.

According to an embodiment of the disclosure, a display driving method is provided that is performed in a driver. The method includes receiving a first synchronization signal; applying at least one of masking, delay, and pulse insertion to the first synchronization signal to generate a second synchronization signal; and outputting a data signal based on the second synchronization signal.

The display driver, the display device, the display system, and the electronic device according to at least one embodiment of the disclosure do not include a frame buffer for storing data, thereby reducing a size and a cost of the display driver.

In addition, a display driving method and a method of driving an electronic device according to at least one embodiment of the disclosure may control a display device to display an image corresponding to data based on a first synchronization signal provided from a host processor without storing data. Furthermore, the display system and the display driving method may generate a second synchronization signal through offset calibration of the first synchronization signal, and control a driver to operate based on the second synchronization signal, thereby maintaining accurate synchronization between the driver and the host processor. Therefore, a frame image may be displayed without a display quality reduction or a display defect.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
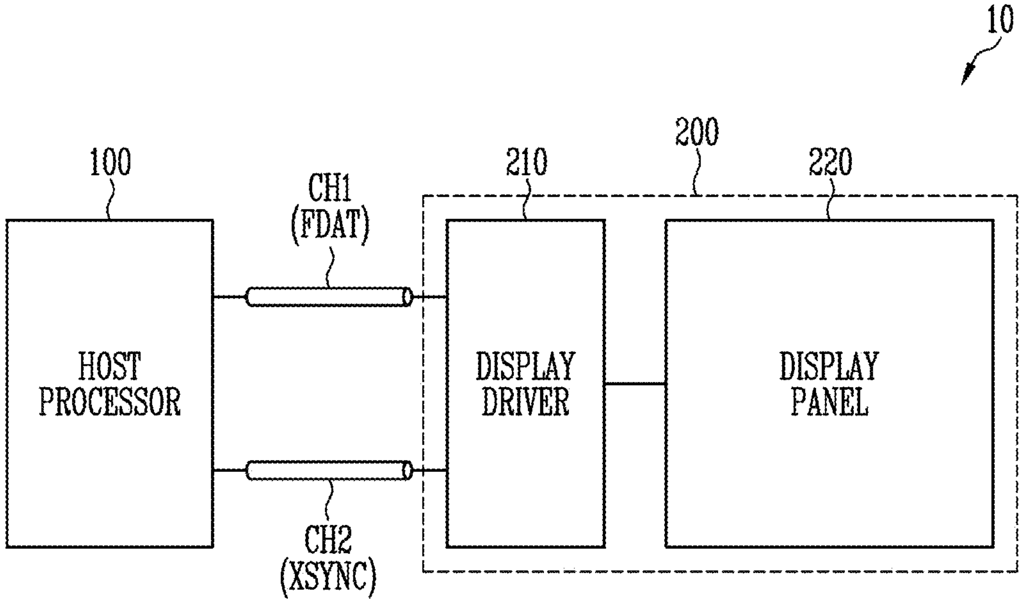
FIG. 1 is a diagram illustrating a display system according to an embodiment of the disclosure.

The disclosure may be modified in various ways and may have various forms, and specific embodiments will be illustrated in the drawings and described in detail herein. In the following description, the singular forms also include the plural forms unless the context clearly includes the singular.

Some embodiments are described in the accompanying drawings in relation to functional block, unit, and/or module. Those skilled in the art will understand that such block, unit, and/or module may be physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, or optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

A term "connection" between two configurations may mean that both of an electrical connection and a physical connection are used inclusively, but is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit of the disclosure. The singular expression includes the plural expression unless the context clearly dictates otherwise.

Meanwhile, the disclosure is not limited to the embodiments disclosed below, and may be modified in various forms and may be implemented. In addition, each of the embodiments disclosed below may be implemented alone or in combination with at least one of other embodiments.

In the drawings, some components which are not directly related to a characteristic of the disclosure may be omitted to clearly represent the disclosure. In addition, some components in the drawings may be shown with a slightly exaggerated, size, ratio, or the like. Throughout the drawings, the same or similar components will be given by the same reference numerals and symbols as much as possible even though they are shown in different drawings, and repetitive descriptions will be omitted.

FIG. 1 is a diagram illustrating a display system according to an embodiment of the disclosure.

Referring to FIG. 1, the display system 10 may include a host processor 100 and a display device 200. The display system 10 may further include a first channel CH1 and a second channel CH2 connecting the host processor 100 and the display device 200. The display device 200 may include a display driver 210 (a driver integrated circuit, a display driving integrated circuit or a driver) and a display panel 220 (or a display).

The display system 10 may be applied to an electronic device such as a computer, a laptop, a cellular phone, a smart phone, a personal digital assistant (PDA), a portable multimedia player (PMP), a digital TV, a digital camera, a portable game console, a navigation device, a wearable device, an Internet of things (IoT) device, an Internet of everything (IoE) device, an e-book, a virtual reality (VR) device, an augmented reality (AR) device, a vehicle navigation system, a video phone, a surveillance system, an automatic focus system, a tracking system, and a motion detection system.

The host processor 100 may output a first synchronization signal XSYNC (an external synchronization signal, or an external clock signal) to the second channel CH2. For example, the host processor 100 may generate a clock signal and generate and output the first synchronization signal XSYNC that is always toggled based on the clock signal.

The host processor 100 may output data FDAT (image data, or frame data) to the first channel CH1. For example, the host processor 100 may generate the data FDAT based on the first synchronization signal XSYNC, and output the data FDAT every frame period.

The first synchronization signal XSYNC may be a signal used for synchronization between the host processor 100 and the display driver 210. The first synchronization signal XSYNC may include a periodic signal or a clock signal. For example, the first synchronization signal XSYNC may correspond to a horizontal synchronization signal used in the display device 200. For example, to prevent flicker due to a minute skew difference of the horizontal synchronization signal and divergence of the horizontal synchronization signal due to a clock variation, the host processor 100 may generate the first synchronization signal XSYNC and share the first synchronization signal XSYNC with the display driver 210. For example, the first synchronization signal XSYNC may be generated and provided to the display driver 210 regardless of transmission of the data FDAT, that is, even in a case in which the data FDAT is not transmitted.

In an embodiment, the host processor 100 may be implemented as at least one of an application processor (AP), a graphics processing unit (GPU), and a central processing unit (CPU). Detailed structure and operation of the host processor 100 are described later with reference to FIG. 3.

The display driver 210 receives the first synchronization signal XSYNC and the data FDAT from the host processor 100, and controls the display panel 220 to display an image (for example, a frame image) corresponding to the data FDAT based on the first synchronization signal XSYNC without storing the data FDAT. For example, the display driver 210 may output a data voltage based on the data FDAT at a timing corresponding to the first synchronization signal XSYNC. The display driver 210 may be implemented so as not to include a frame buffer (for example, a memory device) for storing the data FDAT. For example, the display driver 210 may be implemented as a RAMless integrated circuit (IC). Detailed structure and operation of the display driver 210 are described later with reference to FIG. 2 and the like.

In an embodiment, the data FDAT is transmitted from the host processor 100 to the display driver 210 through the first channel CH1, and the first synchronization signal XSYNC may be transmitted from the host processor 100 to the display driver 210 through the second channel CH2 different from the first channel CH1. That is, the first channel CH1 transmitting the data FDAT and the second channel CH2 transmitting the first synchronization signal XSYNC may be formed separately/independently. However, the disclosure is not limited thereto.

In an embodiment, the first channel CH1 may be implemented based on at least one of various standards, for example, a mobile industry processor interface (MIPI), a high definition multimedia interface (HDMI), a display port (DP), a low power display port (LPDP), and an advanced low power display port (ALPDP). The first channel CH1 may include at least one pair of lines (or at least one lane). Differently from the first channel CH1, the second channel CH2 may include or may be one line, but is not limited thereto. Meanwhile, the first synchronization signal XSYNC transmitted through the second channel CH2 may be a transistor transistor logic (TTL) level signal, but is not limited thereto.

The display panel 220 may display the image based on control of the display driver 210. A detailed structure of the display panel 220 is described later with reference to FIG. 6.

Hereinafter, embodiments of the disclosure are described in detail based on a case in which the first channel CH1 is implemented according to the MIPI standard. However, the disclosure is not limited thereto, and may be applied even in a case in which the first channel CH1 is implemented according to one of various other standards.

Figure 2:
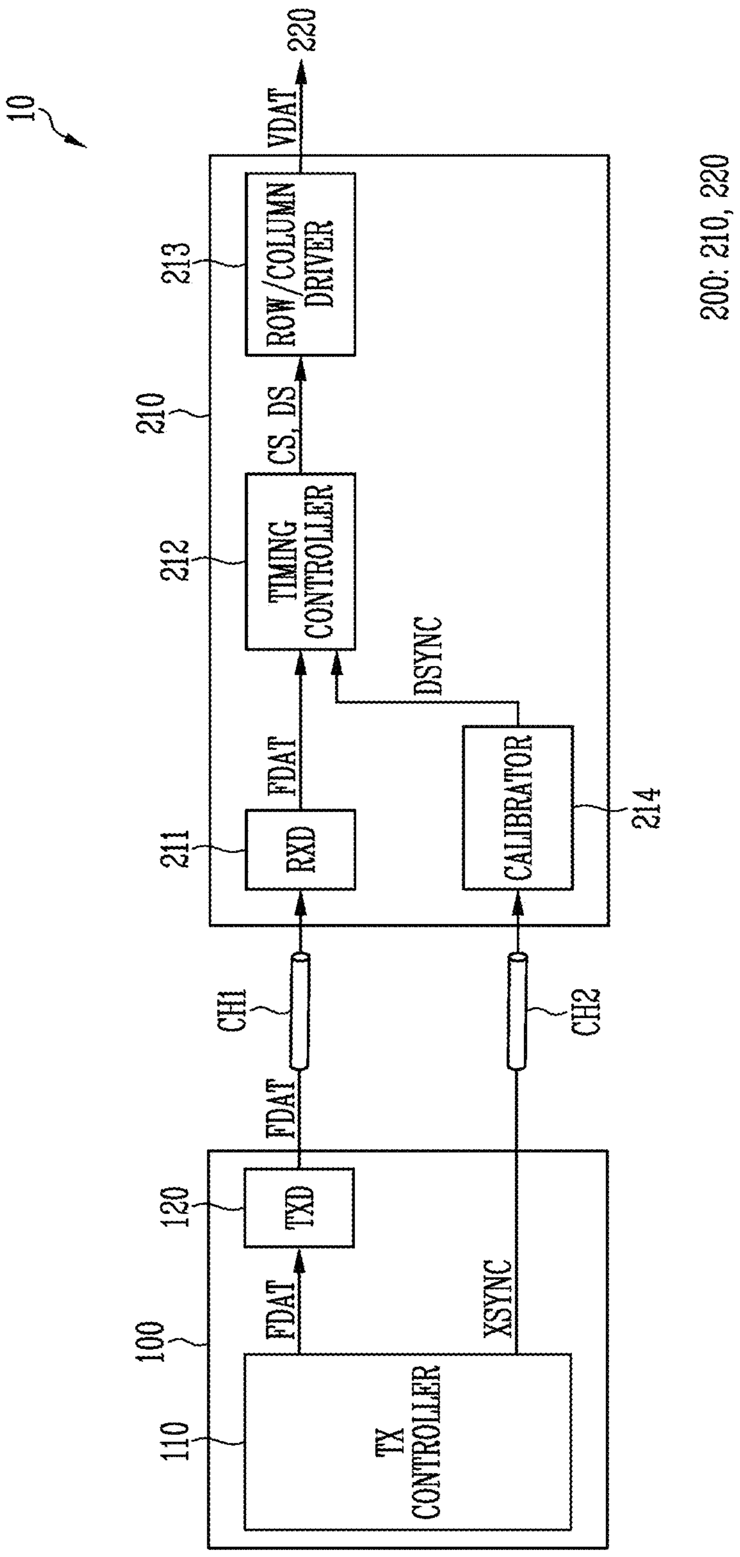
FIG. 2 is a diagram illustrating an embodiment of the display system of FIG. 1.

FIG. 2 is a diagram illustrating an embodiment of the display system of FIG. 1. For convenience, the display panel 220 of FIG. 1 is omitted in FIG. 2.

Referring to FIGS. 1 and 2, the host processor 100 may include a transmit (TX) controller 110 (a controller, or a processor) and a transmitter (TX device; TXD) 120.

The transmission controller 110 may generate the data FDAT and the first synchronization signal XSYNC that is always toggled. For example, the first synchronization signal XSYNC may transition from a first level to a second other level, transition from the second level to the first level, and repeat these transitions continuously. The transmission controller 110 may be connected to the second channel CH2 through an external pin (a contact pin, or a contact pad) of the host processor 100, and the transmission controller 110 may output the first synchronization signal XSYNC to the second channel CH2.

The transmitter 120 may be connected to the first channel CH1 transmitting the data FDAT to the display driver 210. For example, the transmitter 120 may be a transmitter implemented according to the MIPI standard.

The display driver 210 may include a receiver (RX device; RXD) 211, a timing controller 212 (e.g., a control circuit, a controller), a row/column driver 213 (or a panel driver or panel driving circuit), and a calibrator 214 (an offset calibrator, or a synchronizer). The calibrator 214 outputs a second synchronization signal DSYNC based on the first synchronization signal XSYNC. The calibrator 214 may be implemented by a logic circuit. In an embodiment, the display driver 210 does not include a frame buffer (or a memory device) for storing the data FDAT.

The receiver 211 may be connected to the first channel CH1 to receive the data FDAT provided from the host processor 100. For example, the receiver 211 may be a receiver implemented according to the MIPI standard. In an embodiment, the receiver 211 does not include a memory device for storing the data FDAT. According to an embodiment, the data FDAT may include a clock signal. For example, the data FDAT may be clock embedded data, but is not limited thereto. The clock signal is described later with reference to FIGS. 4 and 5.

The timing controller 212 may generate a control signal CS and a data signal DS based on the second synchronization signal DSYNC and the data FDAT without storing the data FDAT. The second synchronization signal DSYNC may be used to control a timing of the data FDAT in the display driver 210. For example, the second synchronization signal DSYNC may include a horizontal synchronization signal.

The row/column driver 213 may generate a data voltage VDAT provided to the display panel 220 based on the control signal CS and the data signal DS. In addition, the row/column driver 213 may generate a gate signal (or a scan signal) based on the control signal CS. The display panel 220 may display an image corresponding to the data FDAT based on the data voltage and the scan signal.

In an embodiment, the timing controller 212 and the row/column driver 213 are implemented as one IC. A driving module in which the timing controller 212 and the row/column driver 213 are integrally formed may be referred to as a timing controller embedded data driver (TED). In another embodiment, the timing controller 212 and the row/column driver 213 may be implemented with different ICs.

The calibrator 214 may be connected to the second channel CH2 through an external pin of the display driver 210, and the calibrator 214 may receive the first synchronization signal XSYNC through the second channel CH2.

The calibrator 214 may generate the second synchronization signal DSYNC having a constant period by performing offset calibration (or offset correction) on the first synchronization signal XSYNC. For example, the calibrator 214 may generate the second synchronization signal DSYNC by processing the first synchronization signal XSYNC using an offset calibration function. In a process of transmitting the first synchronization signal XSYNC through the second channel CH2, the first synchronization signal XSYNC may be distorted because noise is generated/inserted or a delay may occur in the first synchronization signal XSYNC. Therefore, instead of using the first synchronization signal XSYNC as it is, the display driver 210 may cause a period (that is, a period of the second synchronization signal DSYNC) to be constant by processing the first synchronization signal XSYNC. A detailed structure and operation of the calibrator 214 are described later with reference to FIGS. 15 to 19.

In FIG. 2, the calibrator 214 is shown as being independent from the timing controller 212, but is not limited thereto. For example, the calibrator 214 may be included in a timing controller 212 (refer to FIG. 24) or may be one functional block of the timing controller 212.

As described above, since the display driver 210 does not include a frame buffer, an operation of the timing controller 212 and the row/column driver 213, that is, an operation of controlling the display panel 220 to display the image, may be performed without storing data FDAT. When a frame buffer is omitted, a size and a manufacturing cost of the display driver 210 may be reduced, and power consumption of the display driver 210 may be reduced because there is no power consumption due to access of the frame buffer. In addition, while the data FDAT is not transmitted, most of components (for example, the transmitter TXD, and the receiver RXD) of the display system 10 may not operate or may be powered off (for example, deactivated, or may be in an idle mode state), and thus power consumption may be reduced. However, since the data FDAT is required to be directly (or immediately) provided to the display panel 220 through the display driver 210 from the host processor 100 without storing the data FDAT, accurate synchronization between the host processor 100 and the display driver 210 may be required. Therefore, the host processor 100 may provide the first synchronization signal XSYNC to the display driver 210, the display driver 210 (or the calibrator 214) may generate the second synchronization signal DSYNC having a constant period by calibrating the first synchronization signal XSYNC, and the accurate synchronization between the host processor 100 and the display driver 210 may be performed based on the second synchronization signal DSYNC.

The first channel CH1 may be a plurality of wires electrically connecting the transmitter 120 and the receiver 211. For example, the first channel CH1 may indicate a bidirectional digital interface capable of transmitting a digital bitstream, that is, a sequence of bits.

The second channel CH2 may be a single wire electrically connecting the host processor 100 (or the transmission controller 110) and the display driver 210 (or the calibrator 214). For example, the second channel CH2 may indicate a unidirectional or bidirectional signal line capable of transmitting the first synchronization signal XSYNC.

In an embodiment, an operation of transmitting the data FDAT and the first synchronization signal XSYNC is performed in a video mode of the MIPI standard, but is not limited thereto.

Figure 3:
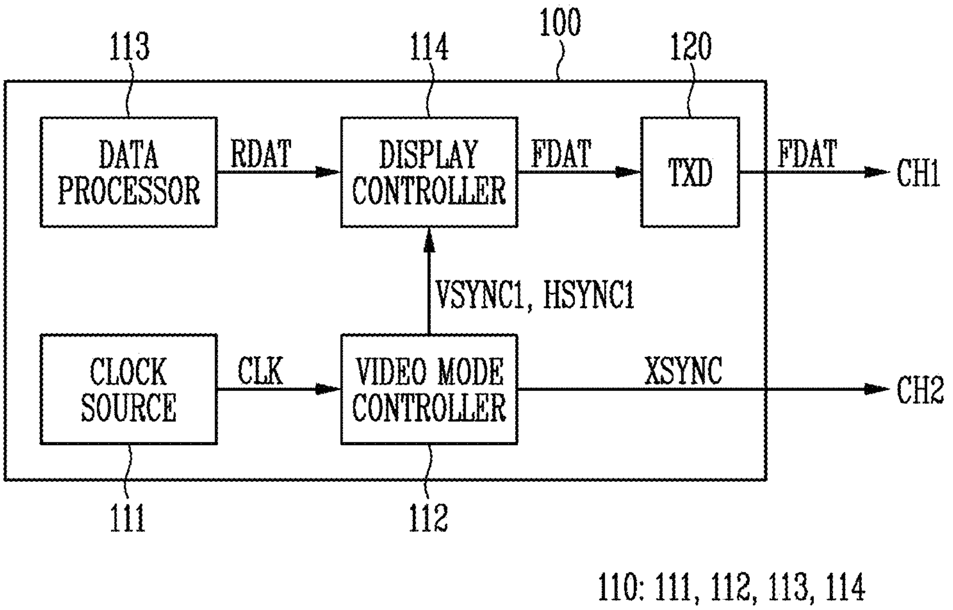
FIG. 3 is a diagram illustrating an embodiment of a host processor included in the display system of FIG. 2.

FIG. 3 is a diagram illustrating an embodiment of the host processor included in the display system of FIG. 2.

Referring to FIGS. 2 and 3, the host processor 100 may include a transmission controller 110 and a transmitter 120. The transmission controller 110 may include a video mode controller 112 and a display controller 114. The transmission controller 110 may further include a clock source 111 and a data processor 113.

The clock source 111 may generate a clock signal CLK that is always toggled. For example, the clock signal CLK may be used to drive various components in the host processor 100 and generate various signals. For example, the clock source 111 may include a ring oscillator, an RC oscillator, a crystal oscillator, or a temperature compensation crystal oscillator, but is not limited thereto.

The video mode controller 112 may generate the first synchronization signal XSYNC based on the clock signal CLK, and generate a first vertical synchronization signal VSYNC1 and a first horizontal synchronization signal HSYNC1 based on the clock signal CLK and the first synchronization signal XSYNC.

The video mode controller 112 may always maintain an activation state. For example, even though the host processor 100 enters an idle mode because the host processor 100 does not generate and output the data FDAT, the video mode controller 112 may not enter the idle mode and always maintain an active mode and may generate the first synchronization signal XSYNC. The first synchronization signal XSYNC may be provided to the second channel CH2.

The first vertical synchronization signal VSYNC1 and the first horizontal synchronization signal HSYNC1 may be used to control a timing of the data FDAT in the host processor 100. Therefore, only in a case in which the display controller 114 is activated, the first vertical synchronization signal VSYNC1 and the first horizontal synchronization signal HSYNC1 may be generated. The first vertical synchronization signal VSYNC1 and the first horizontal synchronization signal HSYNC1 may be referred to as a video synchronization signal.

The data processor 113 may control an overall operation of the host processor 100 and provide raw data RDAT used to generate the data FDAT. For example, the data processor 113 may include a central processing unit (CPU) or the like.

The display controller 114 may control an operation of the display device 200 and the display driver 210, and may generate and output the data FDAT based on the first vertical synchronization signal VSYNC1, the first horizontal synchronization signal HSYNC1, and the raw data RDAT. For example, the data FDAT may be generated and output in a packet form. The display controller 114 may be referred to as a display processing unit (DPU).

The display controller 114 may control an output timing of the data FDAT based on the first vertical synchronization signal VSYNC1 and the first horizontal synchronization signal HSYNC1. For example, the display controller 114 may output the data FDAT by adjusting an output timing of the raw data RDAT based on the first vertical synchronization signal VSYNC1 and the first horizontal synchronization signal HSYNC1. According to an embodiment, the display controller 114 outputs timing information (for example, information on the first vertical synchronization signal VSYNC1 and the first horizontal synchronization signal HSYNC1) on the output timing by including the timing information in the data FDAT.

The data processor 113 and the display controller 114 may be selectively activated. For example, the data processor 113 and the display controller 114 may enter the idle mode when generation and output of the data FDAT is not required, and may be switched from the idle mode to the active mode when the generation and the output of the data FDAT is required.

Meanwhile, the host processor 100 may be implemented by further including a system bus, a memory device, a storage device, function modules, a power management device, and the like. The system bus may correspond to a signal transmission path between components of the host processor 100. The memory device and the storage device may store an instruction, data, and the like required for an operation of the host processor 100. The function modules may perform various functions of the host processor 100, respectively. The power management device may supply a driving voltage to the components of the host processor 100 and control a switching operation between the active mode and the idle mode described above.

Figure 4:
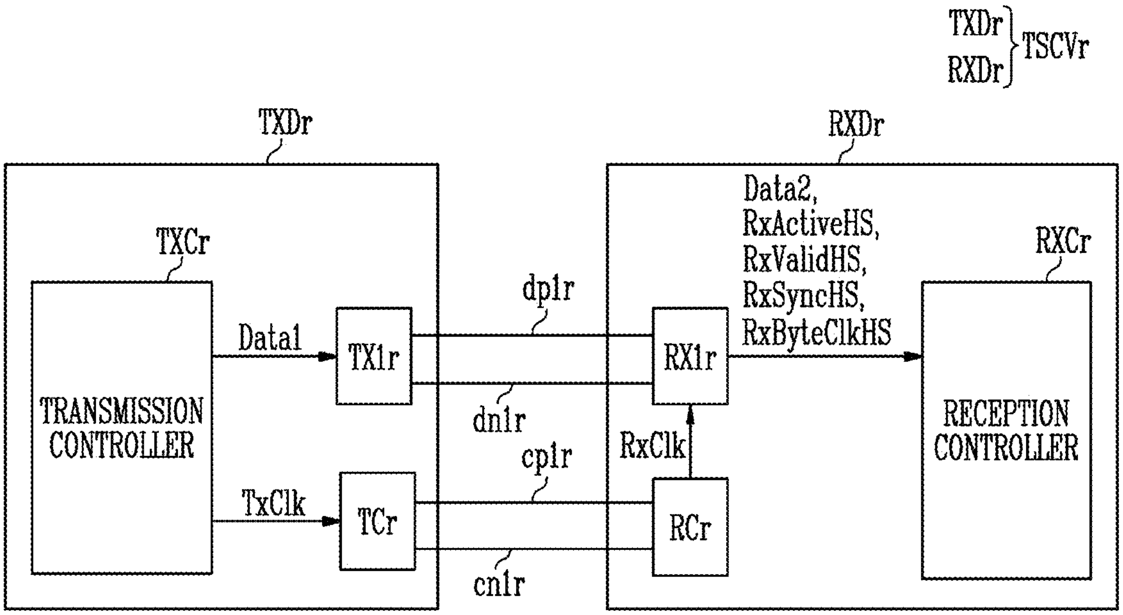
FIG. 4 is a diagram illustrating an embodiment of a transmitter and a receiver included in the display system of FIG. 2.

FIG. 4 is a diagram illustrating an embodiment of the transmitter and the receiver included in the display system of FIG. 2.

Referring to FIGS. 2 and 4, the transmitter TXDr may include a transmission controller TXCr, at least one data transmission unit, and a clock transmission unit TCr. The at least one data transmission unit may include a first data transmission unit TX1*r*. The receiver RXDr may include a reception controller RXCr, at least one data reception unit, and a clock reception unit RCr. The at least one data reception unit may include a first data reception unit RX1*r*.

The first data transmission unit TX1*r* may be connected to the first data reception unit RX1*r* through a first line dp1*r* and a second line dn1*r*. A pair of first line dp1*r* and second line dn1*r* may be included in the first channel CH1 of FIG. 2. The first data transmission unit TX1*r* and the first data reception unit RX1*r* may be referred to as a first data channel. The clock transmission unit TCr may be connected to the clock reception unit RCr through a first clock line cp1*r* and a second clock line cn1*r*. A pair of first clock line cp1*r* and second clock line cn1*r* may be included in a channel (for example, a third channel) different from the first channel CH1 and the second channel CH2 of FIG. 2. A clock signal transmitted through the pair of first clock line cp1*r* and second clock line cn1*r* is different from the first synchronization signal XSYNC transmitted through the second channel CH2 of FIG. 2. The clock transmission unit TCr and the clock reception unit RCr may be referred to as a clock channel. Meanwhile, only one data channel (that is, the pair of first line dp1*r* and second line dn1*r*) is shown between the transmitter TXDr and the receiver RXDr in FIG. 4, but the disclosure is not limited thereto. For example, in FIG. 4, the transmitter TXDr and the receiver RXDr may include four data channels.

The first data transmission unit TX1*r*, the clock transmission unit TCr, the first data reception unit RX1*r*, and the clock reception unit RCr may correspond to a physical layer and a data link layer in an OSI 7 layer model, correspond to a network interface of a TCP/IP protocol, or correspond to a physical layer of a mobile industry processor interface (MIPI) protocol. The physical layer of the MIPI protocol may be configured according to various predetermined specifications such as D-PHY, C-PHY, and M-PHY. Hereinafter, a case in which the first data transmission unit TX1*r*, the clock transmission unit TCr, the first data reception unit RX1*r*, and the clock reception unit RCr are configured according to a D-PHY specification among the physical layers of the MIPI protocol is described as an example.

The transmission controller TXCr and the reception controller RXCr may correspond to a network layer and a transport layer of the OSI 7 layer model, correspond to Internet and transport of the TCP/IP protocol, or correspond to a protocol layer of the MIPI protocol. The protocol layer of the MIPI protocol may be configured according to various predefined specifications such as a display serial interface (DSI) and a camera serial interface (CSI). Hereinafter, a case in which the transmission controller TXCr and the reception controller RXCr are configured according to a DSI specification among the protocol layers of the MIPI protocol is described as an example.

The transmission controller TXCr, the first data transmission unit TX1*r*, and the clock transmission unit TCr may be configurations separated from each other in hardware, or may be a configuration in which at least two or more are integrated in hardware. Meanwhile, the transmission controller TXCr, the first data transmission unit TX1*r*, and the clock transmission unit TCr may be configurations separated from each other in software, or may be a configuration in which at least two or more are integrated in software. Meanwhile, the transmitter TXDr may be configured as a part (hardware or software) of another controller (for example, an application processor (AP), a graphics processing unit (GPU), a central processing unit (CPU), or the like), and may be configured as independent hardware (for example, a transmission dedicated IC).

The reception controller RXCr, the first data reception unit RX1*r*, and the clock reception unit RCr may be configurations separated from each other in hardware, or may be a configuration in which at least two or more are integrated in hardware. Meanwhile, the reception controller RXCr, the first data reception units RX1*r*, and the clock reception unit RCr may be configurations separated from each other in software, or may be a configuration in which at least two or more are integrated in software. Meanwhile, the receiver RXDr may be configured as a part (hardware or software) of another controller (for example, a timing controller (TCON), a TCON embedded driver IC (TED), a driver IC (D-IC), or the like, or may be configured as independent hardware (for example, a reception dedicated IC).

The transmission controller TXCr may provide first data Data1 to the first data transmission unit TX1*r* and provide a transmission clock signal TxClk to the clock transmission unit TCr.

The first data transmission unit TX1*r* may transmit the first data Data1 through the first line dp1*r* and the second line dn1*r*. At this time, the first data transmission unit TX1*r* may transmit another data by adding the other data before and after the first data Data1 according to a predetermined protocol.

The clock transmission unit TCr may transmit the transmission clock signal TxClk through the first clock line cp1*r* and the second clock line cn1*r*.

The clock reception unit RCr may provide a reception clock signal RxClk received through the first clock line cp1*r* and the second clock line cn1*r* to the first data reception unit RX1*r*.

The first data reception unit RX1*r* may sample data received through the first line dp1*r* and the second line dn1*r* based on the reception clock signal RxClk. The first data reception unit RX1*r* may provide second data Data2 including the same payload as the first data Data1 to the reception controller RXCr. Meanwhile, the first data reception unit RX1*r* may provide a plurality of control signals RxActiveHS, RxValidHS, RxSyncHS, and RxByteClkHS according to a protocol of the reception controller RXCr.

Figure 5:
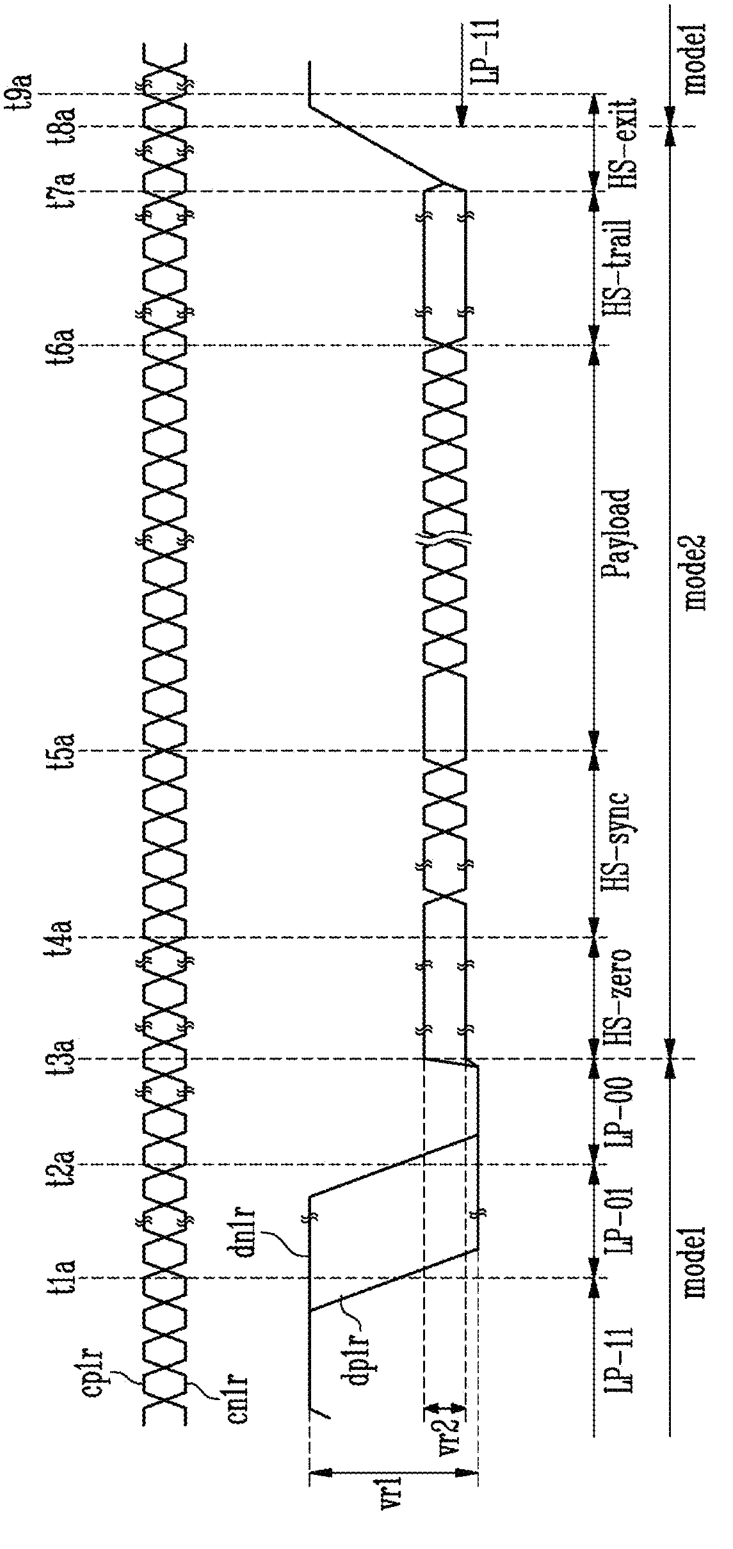
FIG. 5 is a diagram illustrating first data Data1 and a clock signal transmitted between the transmitter and the receiver of FIG. 4.

FIG. 5 is a diagram illustrating the first data Data1 and the clock signal transmitted between the transmitter and the receiver of FIG. 4.

Referring to FIGS. 4 and 5, the first data transmission unit TX1*r* may receive the first data Data1 including a payload Payload, and may transmit another data by adding the other data before and after the payload Payload. For example, when the predetermined protocol is the MIPI protocol, the first data transmission unit TX1*r* may sequentially transmit a pattern HS-zero, a pattern HS-sync, the payload Payload, a pattern HS-trail, and a pattern HS-exit.

The transmitter TXDr (in particular, the first data transmission unit TX1*r*) may transmit signals having a first voltage range vr1 to the first line dp1*r* and the second line dn1*r* in a first mode mode1. Meanwhile, the transmitter TXDr may transmit signals having a second voltage range vr2 less than the first voltage range vr1 to the first line dp1r and the second line dn1r in a second mode mode2.

In the first mode mode1, the first line dp1r and the second line dn1r may be used in a single-ended method. Meanwhile, in the second mode mode2, the first line dp1r and the second line dn1r may be used in a differential method.

In transmitting the payload Payload to the receiver RXDr, the transmitter TXDr may be sequentially driven in the first mode mode1, the second mode mode2, and the first mode mode1.

To inform of a switch from the first mode mode1 to the second mode mode2, the transmitter TXDr may transmit predefined patterns (for example, a pattern LP-11, a pattern LP-01, and a pattern LP-00) to the first line dp1r and the second line dn1r during a period t1a to t2a.

Next, in the second mode mode2, the transmitter TXDr may sequentially transmit the pattern HS-zero, the pattern HS-sync, the payload Payload, the pattern HS-trail, and the pattern HS-exit described above. For example, the transmitter TXDr may transmit the pattern HS-zero during a period t3a to t4a, transmit the pattern HS-sync during a period t4a to t5a, transmit the payload Payload during a period t5a to t6a, transmit the pattern HS-trail during a period t6a to t7a, and transmit the pattern HS-exit after a time point t7a.

The pattern HS-zero may be a pattern for informing of a waiting period after entering from the first mode mode1 to the second mode mode2. For example, the pattern HS-zero may be a pattern in which 0 is repeated.

The pattern HS-sync may be a pattern informing of a transmission start of the payload Payload. For example, the pattern HS-sync may have a OxB8h value or a 00011101 value.

The payload Payload may be effective data to be transmitted. Therefore, the payload Payload may include variable values other than a predetermined pattern.

The pattern HS-trail may be a pattern informing of a transmission end of the payload Payload. The pattern HS-trail may be a pattern in which a value opposite to last data of the payload Payload is repeated. For example, when the last data (bit) of the payload Payload is 0, the pattern HS-trail may be a pattern in which 1 is repeated. For example, when the last data (bit) of the payload Payload is 1, the pattern HS-trail may be a pattern in which 0 is repeated.

The pattern HS-exit may be a pattern informing that the second mode mode2 has ended and the first mode mode1 has started. The pattern HS-exit need not be configured of a specific bit, but may be a transitional pattern in which a voltage is increased to exceed the second voltage range vr2.

The transmitter TXDr may change the signals applied to the first line dp1r and the second line dn1r to a logic high level from a time point t8a (that is, the pattern LP-11). Accordingly, the transmitter TXDr may inform that the second mode mode2 has ended and the first mode mode1 has started.

The transmitter TXDr (in particular, the clock transmission unit TCr) may transmit the transmission clock signal TxClk in a differential mode through the first clock line cp1r and the second clock line cn1r in the sequential first mode mode1, second mode mode2, and first mode mode1. The first data reception unit RX1r may sample data received in the second mode mode2 based on the received clock signal RxClk (refer to FIG. 4).

As described with reference to FIG. 2, when the display driver 210 of FIG. 2 is implemented so as not to store the data FDAT or so as not to include a frame buffer for storing the data FDAT, a period in which the data FDAT of FIG. 2 is not transmitted from the transmitted TXDr to the receiver RXDr may occur, and during the above-described period, the transmitter TXDr and the receiver RXDr may not operate or may be powered off (for example, deactivated, or may be in an idle mode state) for a power consumption reduction. Accordingly, transmission of the first data Data1 and the transmission clock signal TxClk from the transmitter TXDr to the receiver RXDr shown in FIGS. 4 and 5 may be stopped. For example, during the above-described period, a change of a signal level may not occur in the pair of first line dp1r and second line dn1r and the pair of first clock line cp1r and second clock line cn1r.

Meanwhile, the first synchronization signal XSYNC of FIG. 2 may be continuously provided from the host processor 100 to the display driver 210 even in a period in which the data FDAT (that is, the first data Data1 and the transmission clock signal TxClk of FIGS. 4 and 5) is not transmitted.

Figure 6:
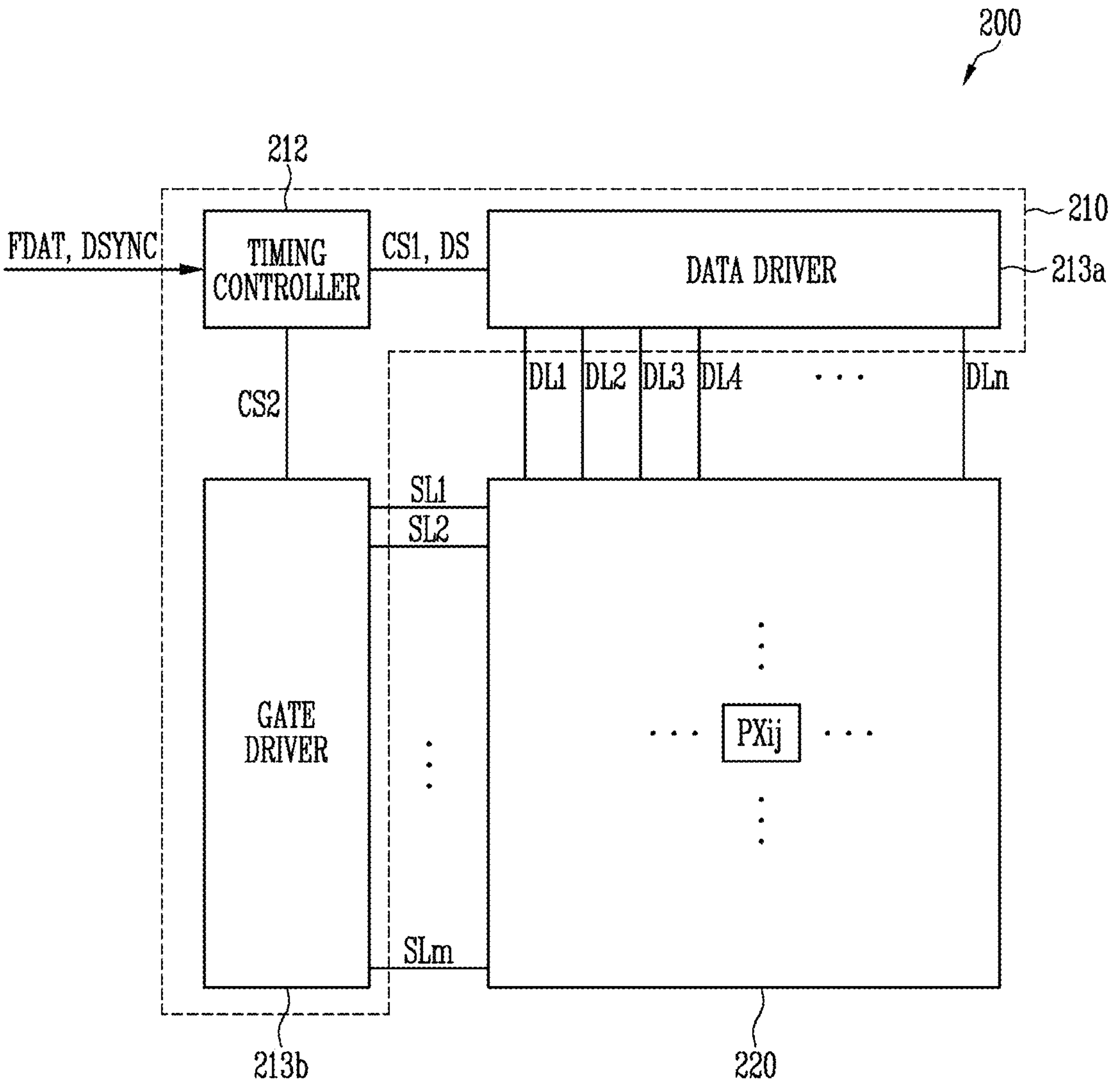
FIG. 6 is a diagram illustrating an embodiment of a display device included in the display system of FIG. 1.

FIG. 6 is a diagram illustrating an embodiment of the display device included in the display system of FIG. 1.

Referring to FIGS. 1 to 6, the display device 200 may include the display panel 220 and the display driver 210. The display driver 210 may include the timing controller 212, a data driver 213a (or a column driver), and a gate driver 213b (or a row driver). The data driver 213a and the gate driver 213b may be included in the row/column driver 213 (refer to FIG. 2).

For convenience of describing an operation of the display device 200 except for synchronization of the host processor 100 and the display device 200, the calibrator 214 is omitted in FIG. 6.

The display device 200 may be driven based on the second synchronization signal DSYNC and the data FDAT (or the image data), and may display the image corresponding to the data FDAT.

The display panel 220 may include data lines DL1, DL2, DL3, DL4, . . . , and DLn and gate lines SL1, SL2, . . . , and SLm (or scan lines). Each of n and m may be a positive integer.

The display panel 220 may be connected to the data driver 213a through the data lines DL1, DL2, DL3, DL4, . . . , and DLn, and may be connected to the gate driver 213b through the gate lines SL1, SL2, . . . , and SLm. The data lines DL1, DL2, DL3, DL4, . . . , and DLn and the gate lines SL1, SL2, . . . , and SLm may extend in a first direction and a second direction intersecting with (for example, orthogonal to) each other, respectively.

The display panel 220 may include pixels. Each pixel PXij may be connected to a corresponding data line among the data lines DL1, DL2, DL3, DL4, . . . , and DLn and a corresponding gate line among the gate lines SL1, SL2, . . . , and SLm. The pixel PXij may include at least one transistor and a light emitting element. A detailed structure of the pixel PXij is described later with reference to FIG. 7.

The pixels may include pixels emitting light of a first color, pixels emitting light of a second color, and pixels emitting light of a third color. The first color, the second color, and the third color may be different colors. For example, the first color may be one of red, green, and blue, the second color may be one of red, green, and blue other than the first color, and the third color may be a remaining one of red, green, and blue other than the first color and the second color. In addition, magenta, cyan, and yellow may be used as the first to third colors instead of red, green, and blue.

The timing controller 212 may control an overall operation of the display device 200. For example, the timing controller 212 may provide a first control signal CS1 to the data driver 213*a* and a second control signal CS2 to the gate driver 213*b* based on the second synchronization signal DSYNC to control operations of the data driver 213*a* and the gate driver 213*b*. For example, the first and second control signals CS1 and CS2 may include a vertical synchronization signal and a horizontal synchronization signal used inside the display device 200. The synchronization signal DSYNC may be derived from the first synchronization signal XSYNC. The first synchronization signal XSYNC may be provided from the host processor 100 of FIG. 1, but is not limited thereto. For example, the first synchronization signal XSYNC may be provided from a device other than the host processor 100.

The timing controller 212 may generate a data signal DS for displaying the image based on the data FDAT. The data FDAT may be provided from the host processor 100 (refer to FIG. 2). For example, the data FDAT may include red image data, green image data, and blue image data. The data FDAT may further include white image data. As another example, the data FDAT may include magenta image data, yellow image data, and cyan image data.

The data driver 213*a* generates data voltages based on the control signal CS1 and the data signal DS, and apply the data voltages to the display panel 220 through the data lines DL1, DL2, DL3, DL4, . . . , and DLn. For example, the data driver 213*a* may include a digital-to-analog converter (DAC) that converts the digital data signal DS into analog data voltages.

The gate driver 213*b* may generate gate signals based on the control signal CS2 and may apply the gate signals to the display panel 220 through the gate lines SL1, SL2, . . . , and SLm. For example, the gate lines SL1, SL2, . . . , and SLm may be sequentially activated based on the gate signals. For example, the gate driver 213*b* may include a shift register that sequentially outputs the gate signals.

Whether components of the display driver 210 (that is, the timing controller 212, the data driver 213*a*, and the gate driver 213*b*) are integrated into one IC, integrated into a plurality of ICs, or mounted on the display panel 220 may be variously configured according to a specification of the display device 200. According to an embodiment, each of the components of the display driver 210 may be implemented as separate circuits/modules/chips, or at least some of the components of the display driver 210 may be combined into one circuit/module/chip or may be further divided into several circuits/modules/chips according to a function. For example, the timing controller 212 and the data driver 213*a* may be integrated into one IC. As another example, the timing controller 212 and the data driver 213*a* may be integrated into a plurality of ICs. For example, the gate driver 213*b* may be mounted on the display panel 220.

Figure 7:
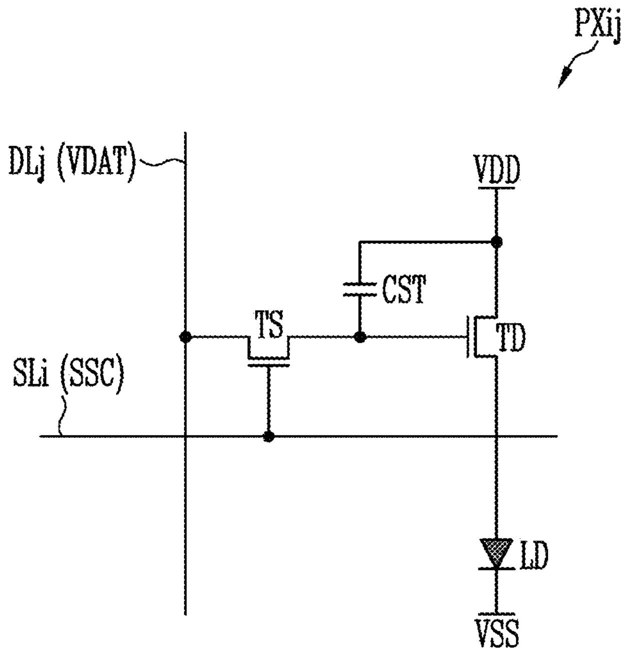
FIG. 7 is a diagram illustrating an embodiment of a pixel included in the display device of FIG. 6.

FIG. 7 is a diagram illustrating an embodiment of the pixel included in the display device of FIG. 6. In FIG. 7, a pixel PXij positioned in an i-th row and a j-th column of the display panel 220 of FIG. 6 is exemplarily shown.

Referring to FIGS. 6 and 7, the pixel PXij may include a first transistor TD (or a driving transistor), a second transistor TS (or a switching transistor), a storage capacitor CST, and a light emitting element LD.

The light emitting element LD may be electrically connected between first power VDD (or a first power line to which the first power VDD is applied) and second power VSS (or a second power line to which the second power VSS is applied). The first power VDD and the second power VSS may have different potentials so that the light emitting element LD emits light. For example, the first power VDD may be set as high potential power, and the second power VSS may be set as low potential power.

The light emitting element LD may emit light with a luminance corresponding to a driving current supplied through the first transistor TD. The light emitting element LD may be configured of an organic light emitting diode or an inorganic light emitting diode, and the inorganic light emitting diode may include a micro light emitting diode or a quantum dot light emitting diode. In an embodiment, the light emitting element LD may be an ultra-small light emitting diode, for example, having a size as small as a nano-scale to a micro-scale, using a material of an inorganic crystal structure. The light emitting element LD may emit light in any one of the first color, the second color, and the third color. According to an embodiment, a plurality of light emitting elements LD may be provided in the pixel PXij, and the plurality of light emitting elements LD may be connected to each other in series, parallel, series and parallel, or the like.

The first transistor TD may be electrically connected between the first power VDD and the light emitting element LD. For example, a first electrode of the first transistor TD may be electrically connected to the first power VDD, and a second electrode of the first transistor TD may be electrically connected to one electrode (for example, an anode electrode). One of the first electrode and the second electrode of the first transistor TD may be a source electrode, and one of the first electrode and the second electrode of the first transistor TD may be a drain electrode. A gate electrode of the first transistor TD may be electrically connected to a second electrode of the second transistor TS. The first transistor TD may control the driving current supplied to the light emitting element LD in response to a voltage applied to the gate electrode. The first transistor TD may be a driving transistor that controls the driving current of the pixel PXij.

The second transistor TS may be electrically connected between a data line DLj and the gate electrode of the first transistor TD. For example, a first electrode of the second transistor TS may be electrically connected to the data line DLj, and the second electrode of the second transistor TS may be electrically connected to the gate electrode of the first transistor TD. A gate electrode of the second transistor TS is electrically connected to a gate line SLi. The second transistor TS may be turned on when a gate signal SSC (or a scan signal) of a gate-on voltage (for example, a high level voltage) is supplied from the gate line SLi, to electrically connect the data line DLj and the gate electrode of the first transistor TD. During a period in which the gate signal SSC of the gate-on voltage is supplied to the pixel PXij, a data voltage VDAT of the data line DLj may be transmitted to the gate electrode of the first transistor TD through the turned-on second transistor TS. That is, the second transistor TS may be a switching transistor for transmitting the data voltage VDAT to an inside of the pixel PXij.

The first and second transistors TD and TS may include a silicon semiconductor or an oxide semiconductor. Each of the first and second transistors TD and TS may be an N-type transistor, but is not limited thereto. For example, at least one of the first and second transistors TD and TS may be changed to a P-type transistor.

A storage capacitor CST may be formed or connected between the first power VDD and the gate electrode of the first transistor TD. The storage capacitor CST may charge a voltage corresponding to a voltage (for example, the data voltage VDAT) applied to the gate electrode of the first transistor TD.

Meanwhile, a structure and a driving method of the pixel PXij may be variously changed. For example, the pixel PXij may further include other circuit elements such as a first initialization transistor for applying an initialization voltage to an anode electrode of the light emitting element LD, a compensation transistor for compensating for a threshold voltage or the like of the first transistor TD, a second initialization transistor for initializing the gate electrode of the first transistor TD, an emission control transistor for controlling a period in which the driving current is supplied to the light emitting element LD, and/or a boosting capacitor for boosting a voltage of the gate electrode of the first transistor TD.

Figure 8:
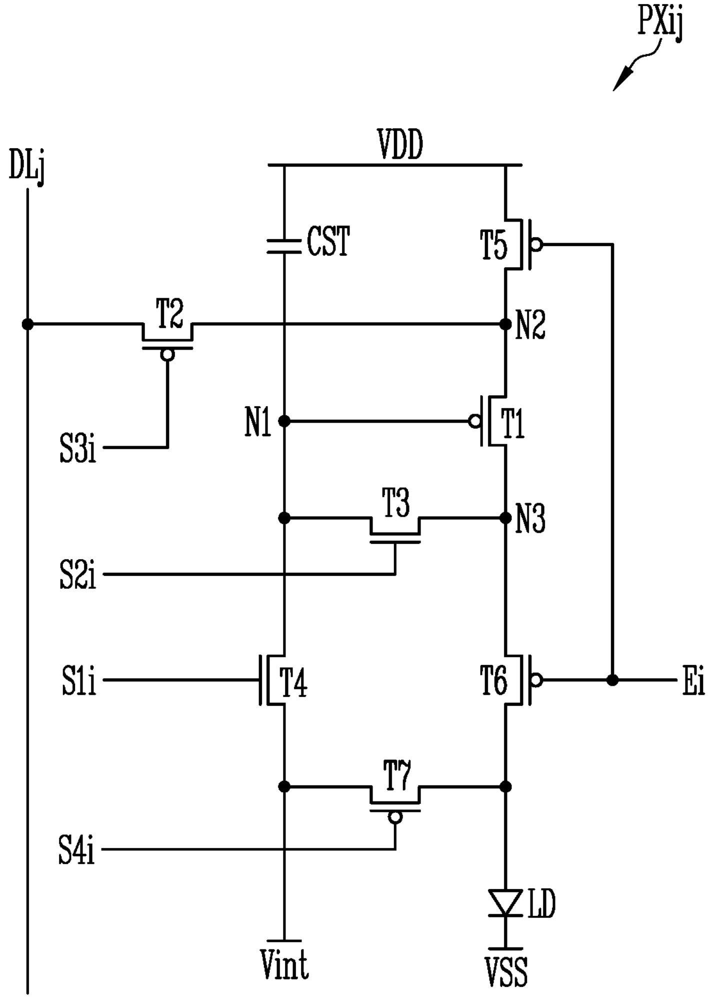
FIG. 8 is a diagram illustrating an embodiment of the pixel included in the display device of FIG. 6.

FIG. 8 is a diagram illustrating another embodiment of the pixel included in the display device of FIG. 6.

Referring to FIGS. 6 and 8, the pixel PXij may include a light emitting element LD, first to seventh transistors T1 to T7, and a storage capacitor CST. Since the light emitting element LD of FIG. 8 is substantially the same as or similar to the light emitting element LD of FIG. 7, an overlapping description is not repeated. An i-th first scan line S1*i*, an i-th second scan line S2*i*, an i-th third scan line S3*i*, and an i-th fourth scan line S4*i* of FIG. 8 may be included in or correspond to the gate lines SL1, SL2, . . . , and SLm of FIG. 6.

A first electrode (anode electrode or cathode electrode) of the light emitting element LD is connected to the sixth transistor T6, and a second electrode (cathode electrode or anode electrode) is connected to second power VSS. The light emitting element LD generates light of a predetermined luminance in response to an amount of current supplied from the first transistor T1.

The first transistor T1 (or a driving transistor) may be connected between a second node N2 and a third node N3. A gate electrode of the first transistor T1 may be connected to a first node N1. The first transistor T1 may control the amount of current (driving current) flowing from first power VDD to the second power VSS via the light emitting element LD based on a voltage of the first node N1. To this end, the first power VDD may be set to a voltage higher than that of the second power VSS.

The second transistors T2 (or a switching transistor) may be connected between a data line DLj and the second node N2. A gate electrode of the second transistor T2 may be connected to the i-th third scan line S3*i* (hereinafter, referred to as a third scan line). The second transistor T2 may be turned on when a third scan signal is supplied to the third scan line S3*i* to electrically connect the data line DLj and the second node N2.

The third transistor T3 may be connected between the first node N1 and the third node N3. A gate electrode of the third transistor T3 may be connected to the i-th second scan line S2*i* (hereinafter, referred to as a second scan line). The third transistor T3 may be turned on when a second scan signal is supplied to the second scan line S2*i*, and the first transistor T1 may have a diode connection form. When the first transistor T1 has the diode connection form, a threshold voltage of the first transistor T1 may be compensated.

The fourth transistor T4 may be connected between the first node N1 and initialization power Vint. A gate electrode of the fourth transistor T4 may be connected to an i-th first scan line S1*i* (hereinafter, referred to as a first scan line). The fourth transistor T4 may be turned on when a first scan signal is supplied to the first scan line S1*i* to supply a voltage of the initialization power Vint to the first node N1.

The fifth transistor T5 (or a first emission control transistor) may be connected between the first power VDD and the second node N2. A gate electrode of the fifth transistor T5 may be connected to an emission control line Ei. The sixth transistor T6 (or a second emission control transistor) may be connected between the third node N3 and the light emitting element LD. A gate electrode of the sixth transistor T6 may be connected to the emission control line Ei. The fifth transistor T5 and the sixth transistor T6 may be turned off when an emission control signal is supplied to the emission control line Ei, and may be turned on in other cases. That is, the fifth transistor T5 and the sixth transistor T6 may be connected to the light emitting element LD in series to control an emission duty of the light emitting element LD.

The seventh transistor T7 may be connected between the first electrode of the light emitting element LD and the initialization power Vint. A gate electrode of the seventh transistor T7 may be connected to the i-th fourth scan line S4*i* (hereinafter, referred to as a fourth scan line). The seventh transistor T7 may be turned on by a fourth scan signal supplied to the fourth scan line S4*i* to supply the voltage of the initialization power Vint to the first electrode of the light emitting element LD. According to an embodiment, the voltage of the initialization power Vint supplied to the first electrode of the light emitting element LD may be different from the voltage of the initialization power Vint supplied to the first node N1. For example, the initialization power Vint may include a first initialization power supplied to the first node N1 of the light emitting element LD and a second initialization power supplied to the first electrode of the light emitting element LD, the fourth transistor T4 may be connected to the first initialization power, and the seventh transistor T7 may be connected to the second initialization power.

The first to seventh transistors T1 to T7 may include a silicon semiconductor or an oxide semiconductor. For example, the third and fourth transistors T3 and T4 may include an oxide semiconductor, and the remaining transistors (that is, T1, T2, T5, T6, and T7) may include a silicon semiconductor. According to an embodiment, each of the third and fourth transistors T3 and T4 may be an N-type transistor, and the remaining transistors (that is, T1, T2, T5, T6, and T7) may be P-type transistors, but the disclosure is not limited thereto.

The storage capacitor CST may be connected between the first power VDD and the first node N1.

Figure 9:
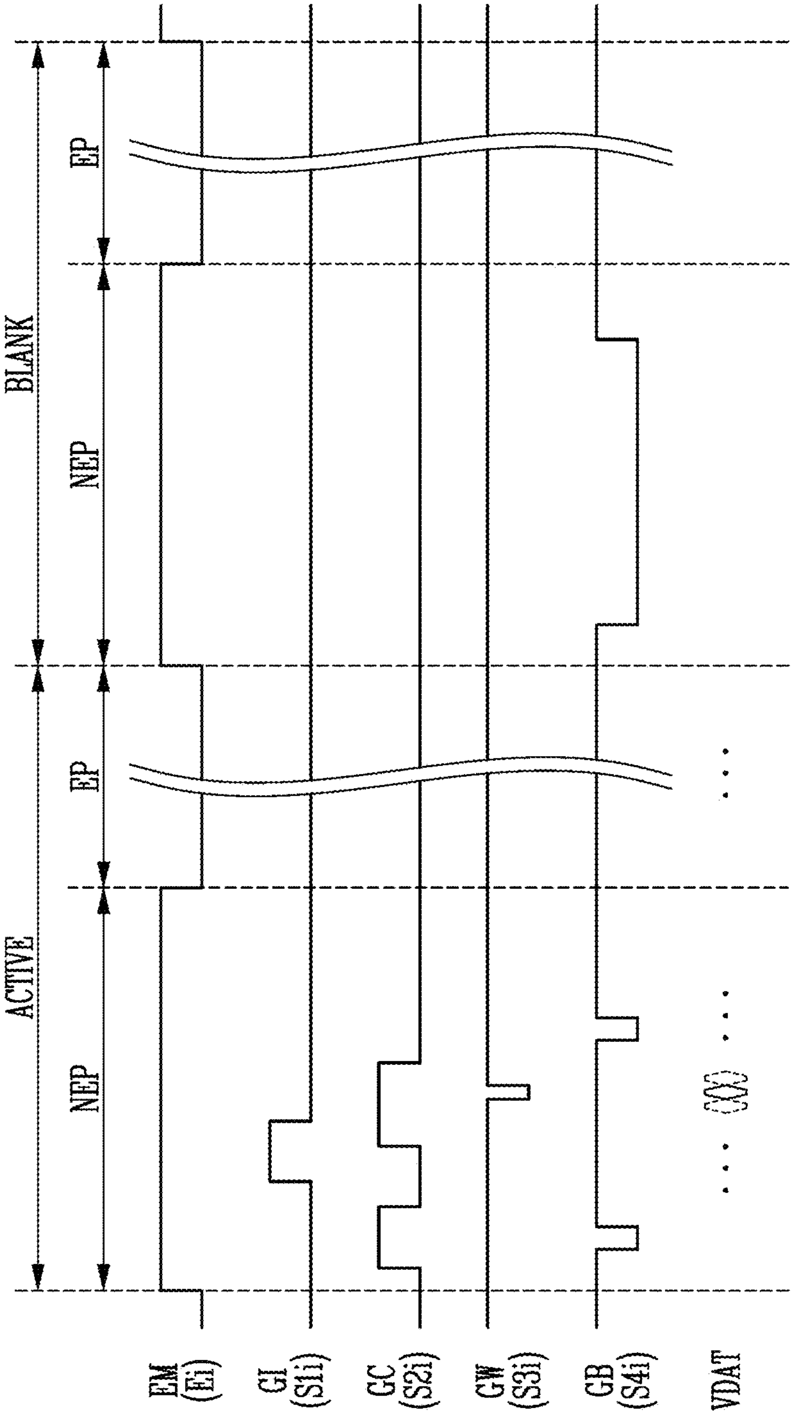
FIG. 9 is a timing diagram illustrating an operation of the pixel of FIG. 8.

FIG. 9 is a timing diagram illustrating an operation of the pixel of FIG. 8.

Referring to FIGS. 6, 8 and 9, an emission control signal EM may be supplied to the emission control line Ei, a first scan signal GI (or an initialization scan signal) may be supplied to the first scan line SL1*i*, a second scan signal GC (or a compensation scan signal) may be supplied to the second scan line S2*i*, a third scan signal GW (or a write scan signal) may be supplied to the third scan line S3*i*, and a fourth scan signal GB (or a bias scan signal) may be supplied to the fourth scan line S4*i*.

The data voltage VDAT may be supplied to the data line DLj in an active period ACTIVE, and the data voltage VDAT is not supplied to the data line DLj in a blank period BLANK. For example, in the active period ACTIVE, the data FDAT of FIGS. 1 and 2 may have valid data, the data FDAT may be transmitted from the host processor 100 to the display driver 210 (refer to FIG. 12), and the data voltage VDAT may have a voltage level corresponding to the data FDAT. In at least a portion of the blank period BLANK, the data FDAT of FIGS. 1 and 2 does not have valid data, for example, the data FDAT is not transmitted from the host processor 100 to the display driver 210 (refer to FIG. 12), and the data voltage VDAT is not supplied to the data line DLj. The active period ACTIVE and the blank period BLANK may be included in a frame period (refer to Frame of FIG. 10) in which one image (or one frame image) is displayed.

Gate signals for displaying an image may be provided during the active period ACTIVE, and some gate signals for maintaining the image (or a luminance of the image) may be provided during the blank period BLANK.

In a non-emission period NEP, the emission control signal EM may have a high level (or a first turn-off voltage level), and in an emission period EP, the emission control signal EM may have a low level (or a first turn-on voltage level).

The active period ACTIVE may include the non-emission period NEP in which the pixel PXij does not emit light and the emission period EP in which the pixel PXij emits light. The blank period BLANK may also include the non-emission period NEP and the emission period EP, but is not limited thereto. Although the emission period EP is shown to be smaller than the non-emission period NEP in FIG. 9, this is for describing an operation of the pixel PXij in the non-emission period NEP, and most of each of the active period ACTIVE and the blank period BLANK may be the emission period EP. For example, the emission period EP may be longer than the non-emission period.

First, an operation of the pixel PXij in the active period ACTIVE is described.

In the non-emission period NEP of the active period ACTIVE, the second scan signal GC may transition to have a high level (or a second turn-on voltage level). In this case, the third transistor T3 may be turned on in response to the second scan signal GC. The first transistor T1 may be connected in a diode form by turn-on of the third transistor T3.

While the second scan signal GC has the high level (or the second turn-on voltage level), the fourth scan signal GB may transition to have the low level (or the first turn-on voltage level). In this case, the seventh transistor T7 may be turned on in response to the fourth scan signal GB. A voltage of the first electrode of the light emitting element LD may be initialized by turn-on of the seventh transistor T7.

Thereafter, the first scan signal GI may transition to have the high level (or the second turn-on voltage level). In this case, the fourth transistor T4 may be turned on in response to the first scan signal GI. The voltage of the first node N1 may be initialized by turn-on of the fourth transistor T4.

While the first scan signal GI has the high level (or the second turn-on voltage level), the second scan signal GC may transition to have the high level (or the second turn-on voltage level). In this case, the third transistor T3 may be turned on again in response to the second scan signal GC. The first transistor T1 may be connected in a diode form, and a voltage corresponding to the threshold voltage of the first transistor T1 may be sampled at the first node N1, by turn-on of the third transistor T3.

Thereafter, while the second scan signal GC has the high level (or the second turn-on voltage level), the third scan signal GW may transition to have the low level (or the first turn-on voltage level). In this case, the second transistor T2 may be turned on in response to the third scan signal GW and the data voltage VDAT of the data line DLj may be transmitted to the first node N1 through the turned-on second and third transistors T2 and T3. The storage capacitor CST may be charged with a voltage in which a pre-sampled threshold voltage is reflected in the data voltage VDAT.

Thereafter, the fourth scan signal GB may have the low level (or the first turn-on voltage level). In this case, the seventh transistor T7 may be turned on in response to the fourth scan signal GB, and the voltage of the first electrode of the light emitting element LD may be initialized by turn-on of the seventh transistor T7.

Thereafter, in the emission period EP of the active period ACTIVE, the emission control signal EM may transition to have the low level (or the first turn-on voltage level), and the pixel PXij may emit light with a luminance corresponding to the voltage charged in the storage capacitor CST.

As described above, in the active period ACTIVE, a display scan operation for writing the data voltage VDAT to the pixel PXLij may be performed.

Next, an operation of the pixel PXij in the blank period BLANK is described.

In the blank period BLANK, each of the first scan signal GI and the second scan signal GC may be maintained at the low level (or the second turn-off voltage level), and the third scan signal GW may be maintained at the high level (or the first turn-off voltage level). This is because the data voltage VDAT is not applied to the data line DLj (with reference to FIGS. 1 and 2, for example, the data FDAT is not transmitted from the host processor 100 to the display driver 210), and thus the data voltage VDAT is not required to be written to the pixel PXij in the blank period BLANK.

In the non-emission period NEP of the blank period BLANK, the fourth scan signal GB may transition to have the low level (or the first turn-on voltage level). In this case, the seventh transistor T7 may be turned on in response to the fourth scan signal GB. The voltage of the first electrode of the light emitting element LD may be initialized by turn-on of the seventh transistor T7. For reference, as the emission period EP (for example, the emission period EP of the active period ACTIVE) increases, the voltage of the first electrode of the light emitting element LD may vary, and a variation of the voltage of the first electrode may appear as a luminance change (for example, a luminance decrease, flicker, or the like). To prevent such a luminance change, in the non-emission period NEP of the blank period BLANK, the fourth scan signal GB may transition to have the low level (or the first turn-on voltage level).

A time when the fourth scan signal GB has the low level (or the first turn-on voltage level) in the blank period BLANK may be greater than a time when the fourth scan signal GB has the low level in the active period ACTIVE, but is not limited thereto.

Thereafter, in the emission period EP of the blank period BLANK, the emission control signal EM may transition to have the low level (or the first turn-on voltage level), and the pixel PXij may emit light again with a luminance corresponding to a voltage pre-charged in the storage capacitor CST (that is, a voltage pre-written in the active period ACTIVE).

As described above, in the blank period BLANK, a self-scan operation for preventing a luminance variation of the pixel PXLij may be performed without writing of the data voltage VDAT to the pixel PXLij.

Figure 10:
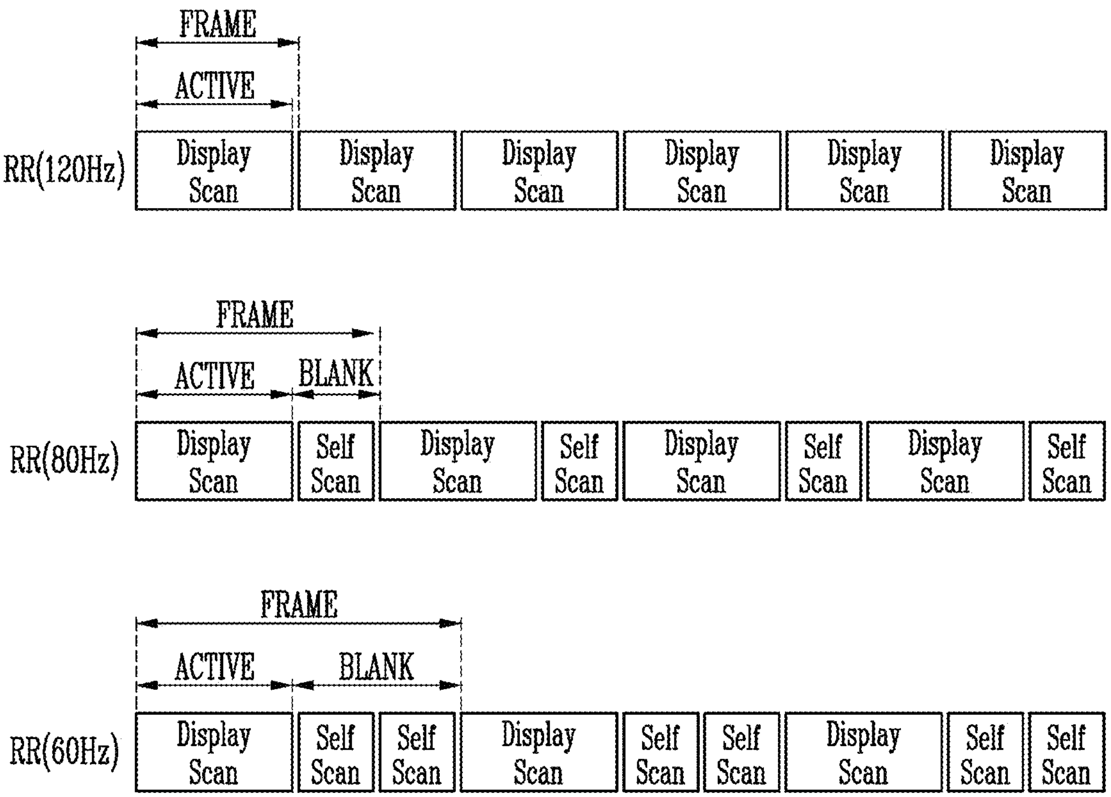
FIG. 10 is a diagram illustrating a method of driving the display device including the pixel of FIG. 8.

FIG. 10 is a diagram illustrating a method of driving the display device including the pixel of FIG. 8.

Referring to FIGS. 8 to 10, an operation of the active period ACTIVE of FIG. 9, that is, a display scan operation, is performed in the active period ACTIVE, and an operation of the blank period BLANK of FIG. 9, that is, a self-scan operation may be performed in the blank period BLANK.

A time in which one display scan operation is performed (or a period of the display scan operation) may be different from a time in which one self-scan operation is performed (or a period of the self-scan operation). For example, a time of the display scan operation may be twice a time of a scan operation. However, the disclosure is not limited thereto. For example, the time of the display scan operation may be equal to the time of the scan operation.

In embodiments, the number of self-scan operations performed in one frame FRAME (or one frame period) may be changed according to a refresh rate (a driving frequency, or a frame frequency) of an image signal. In other words, the display device may display the image at various refresh rates by changing the number (a period, or a time) of the self-scan operation included in one frame FRAME.

For example, when the display device 200 (refer to FIG. 6) is driven at a refresh rate RR of 120 Hz, only the display scan operation may be performed during one frame FRAME. Since the data voltage VDAT is required to be continuously supplied to the display panel 220, the data FDAT may be continuously transmitted from the host processor 100 to the display driver 210 of FIGS. 1 and 2.

For example, when the display device 200 (refer to FIG. 6) is driven at a refresh rate RR of 80 Hz, one display scan operation in the active period ACTIVE and one self-scan operation of the blank period BLANK may be performed during one frame FRAME. As described above, during the blank period BLANK, data transmission from the host processor 100 to the display driver 210 of FIGS. 1 and 2 may be stopped.

For example, when the display device 200 (refer to FIG. 6) is driven at a refresh rate RR of 60 Hz, two self-scan operations may be performed in the blank period BLANK during one frame FRAME.

The display device 200 (refer to FIG. 6) may be driven or may display the image at various refresh rates RR such as 48 Hz, 30 Hz, 24 Hz, and 1 Hz by adjusting the number of self-scan operations performed in one frame FRAME in a method similar to the above.

Figure 11:
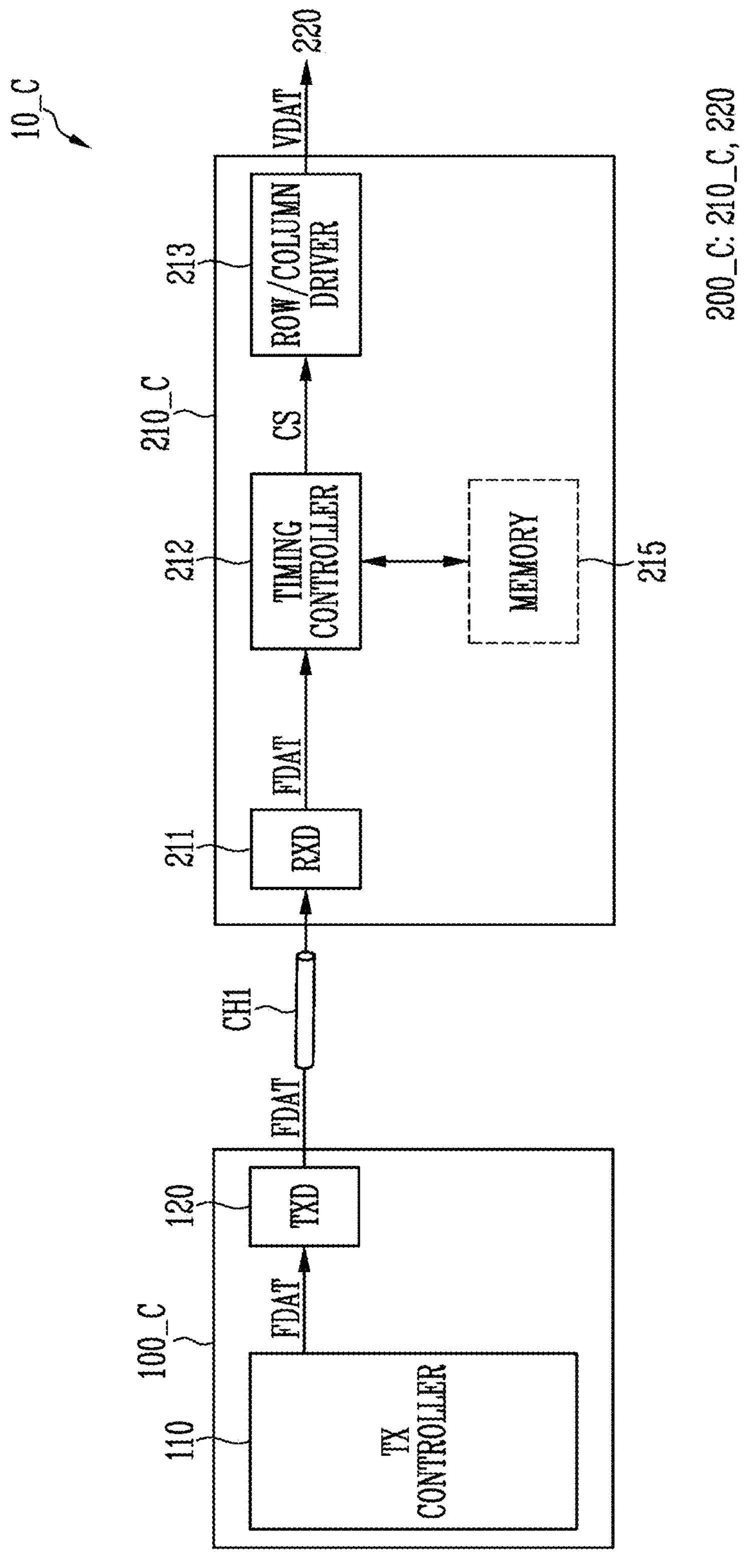
FIG. 11 is a diagram illustrating a display system according to a comparative embodiment.

FIG. 11 is a diagram illustrating a display system according to a comparative embodiment.

Referring to FIGS. 2 and 11, compared to the display system 10 of FIG. 2, the display system 10_C of FIG. 11 includes a memory 215 (a memory device, or a frame buffer) of a display driver 210_C, and does not include the second channel CH2.

The display driver 210_C may receive the data FDAT from the host processor 100, store the data FDAT in the memory 215, and generate the data signal DS corresponding to the data FDAT in response to an internal synchronization signal. Differently from the display system 10 of FIG. 2, since the data FDAT is stored in the memory 215, the host processor 100 and the display driver 210 are not required to be completely synchronized. Therefore, the host processor 100_C does not generate and output the first synchronization signal XSYNC of FIG. 2, and the display system 10_C does not include the second channel CH2 for transmission of the first synchronization signal XSYNC.

Since the display driver 210 of FIG. 2 does not include a frame buffer (for example, the memory 215 of FIG. 11), the host processor 100 may provide the first synchronization signal XSYNC to the display driver 210 for accurate synchronization between the host processor 100 and the display driver 210 of FIG. 2. In addition, the display driver 210 of FIG. 2 may generate the second synchronization signal DSYNC having a constant period by calibrating the first synchronization signal XSYNC.

Figure 12:
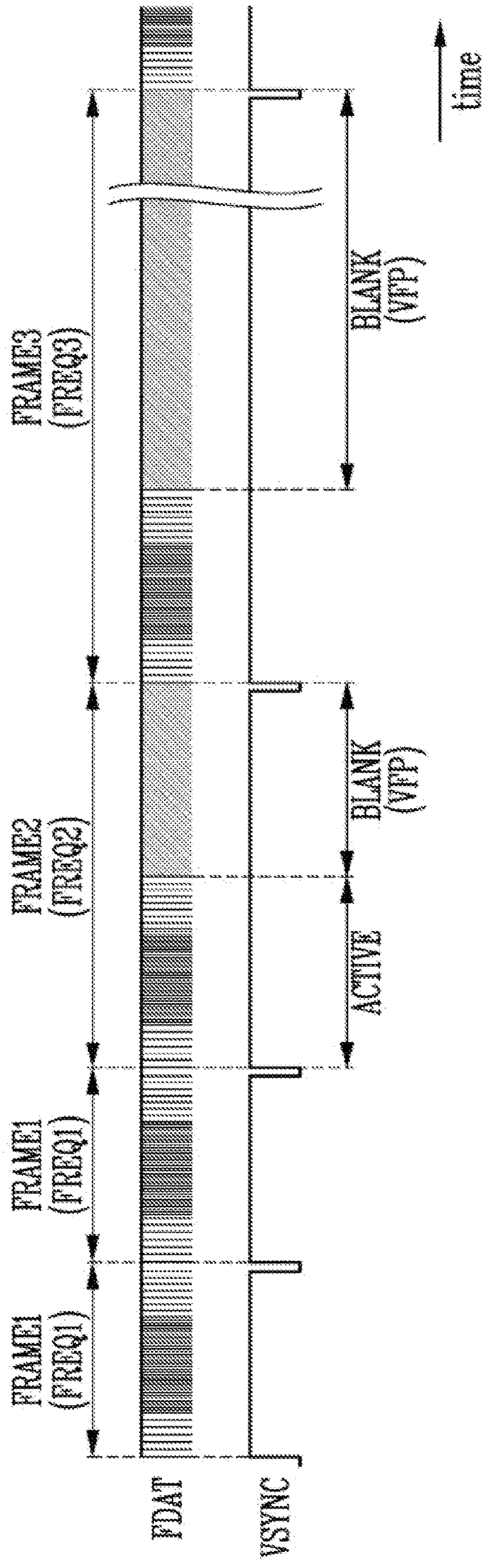
FIG. 12 is a waveform diagram illustrating data and a vertical synchronization signal generated by the display system of FIG. 1.
Figure 13:
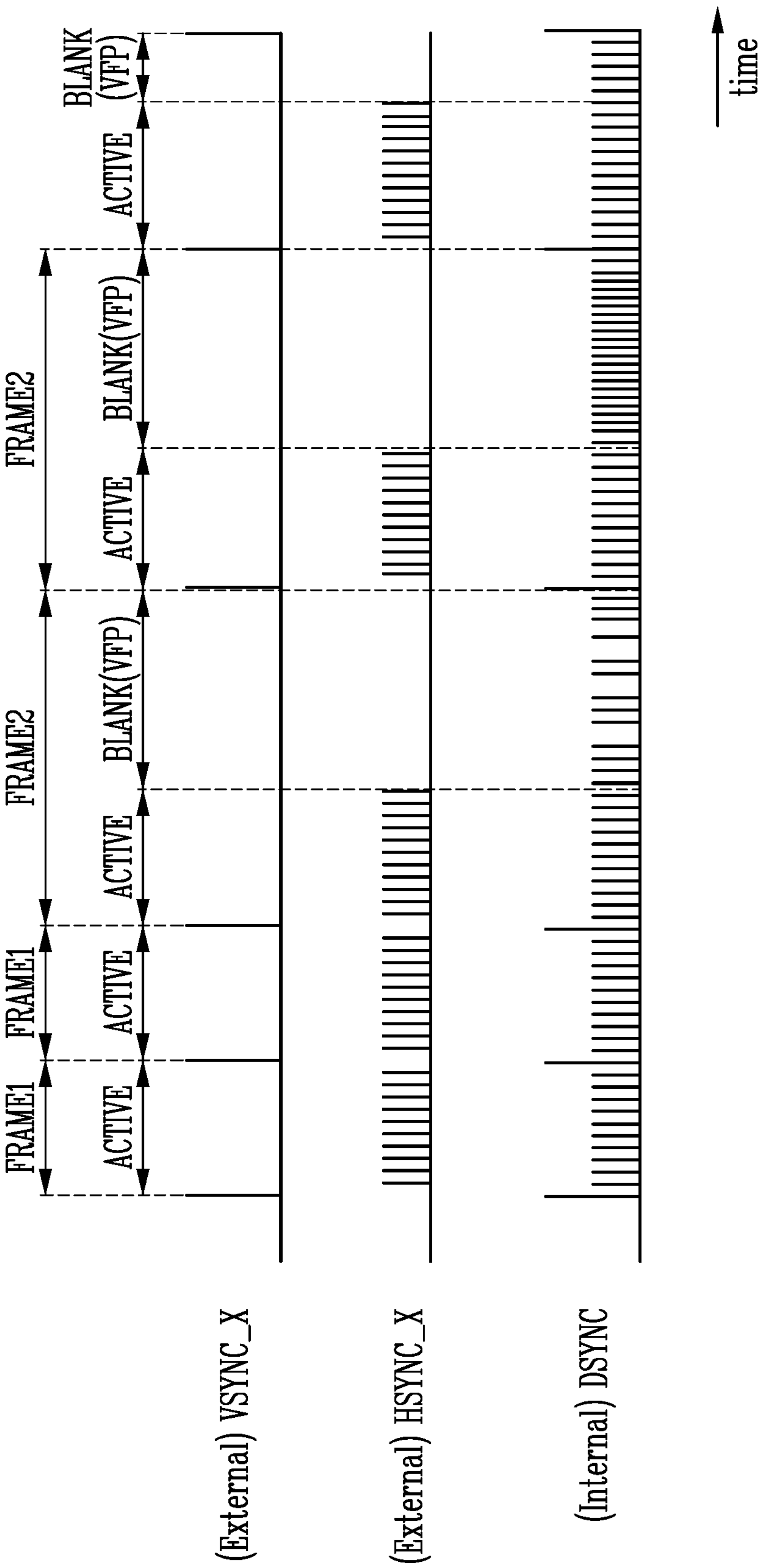
FIG. 13 is a waveform diagram illustrating a second synchronization signal according to a comparative example.
Figure 14:
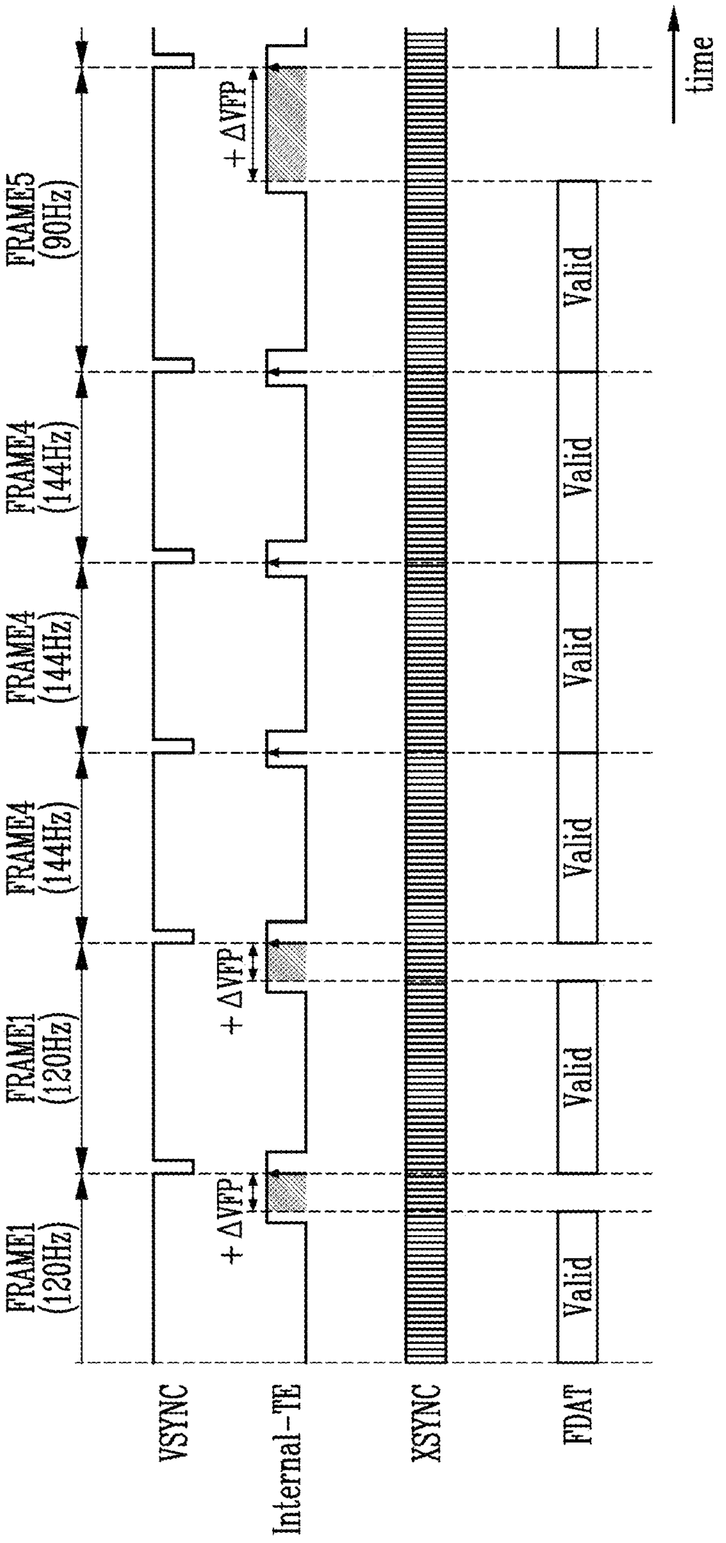
FIG. 14 is a waveform diagram illustrating synchronization signals and data generated by the display system of FIG. 1.

FIG. 12 is a waveform diagram illustrating data and a vertical synchronization signals generated by the display system of FIG. 1. FIG. 13 is a waveform diagram illustrating a second synchronization signal according to a comparative example. For convenience of description, an external vertical synchronization signal and an external horizontal synchronization signal are further shown in FIG. 13. FIG. 14 is a waveform diagram illustrating synchronization signals and data generated by the display system of FIG. 1.

First, referring to FIGS. 1, 2, 11, and 12, the display system 10 (or the display device 200) may display an image by varying the driving frequency (the refresh rate, or a frame update period). For example, the display system 10 may operate at a first driving frequency FREQ1 in a first frame period FRAME1 (or a first driving period), operate at a second driving frequency FREQ2 in a second frame period FRAME2 (or a second driving period), and operate at a third driving frequency FREQ3 in a third frame period FRAME3. For example, the first driving frequency FREQ1 may be 120 Hz, the second driving frequency FREQ2 may be 60 Hz, and the third driving frequency FREQ3 may be 1 Hz. A vertical synchronization signal VSYNC (or a pulse of the vertical synchronization signal VSYNC) may define a start of the frame period. However, the driving frequency is not limited thereto. For example, the driving frequency may be variously varied, such as 144 Hz of a fourth frame period FRAME4 and 90 Hz of a fifth frame period FRAME5 shown in FIG. 14.

To this end, the display system 10 may vary a width (or a time width) of the frame period by varying the blank period BLANK (in particular, a front porch period VFP) of the frame period. The frame period may include the active period ACTIVE (or an active frame) and the blank period BLANK (a vertical blank period, or a blank frame), and the blank period BLANK may include a back porch period before the active period ACTIVE and the front porch period VFP after the active period ACTIVE in the frame period.

In the active period ACTIVE, the data FDA may have valid data, and for example, the valid data may be transmitted from the host processor 100 to the display driver 210 in the active period ACTIVE. In at least a portion of the blank period BLANK, the data FDA may not have valid data, and for example, data may not be transmitted from the host processor 100 to the display driver 210 in at least a portion of the blank period BLANK. For example, since the display driver 210 does not include a frame buffer, the host processor 100 may transmit new data FDAT to the display driver 210 only in a case in which a frame update or an update of the display panel 220 is required. In at least a portion of the blank period BLANK, most components of the display system 10 may be switched to an idle mode (for example, from an activation state to a deactivation state), and thus power consumption may be reduced.

Referring to FIGS. 2, 12, and 13, in the active period ACTIVE, the display driver 210 may generate the external vertical synchronization signal VSYNC_X (or a second vertical synchronization signal) and the external horizontal synchronization signal HSYNC_X (or a second horizontal synchronization signal), and maintain synchronization with the host processor 100 based on the external vertical synchronization signal VSYNC_X and the external horizontal synchronization signal HSYNC_X. For example, as described with reference to FIG. 3, when the host processor 100 includes information on the synchronization signal in the data FDAT and outputs the information, the display driver 210 may generate the external vertical synchronization signal VSYNC_X and the external horizontal synchronization signal HSYNC_X based on the information on the synchronization signal, and the external vertical synchronization signal VSYNC_X and the external horizontal synchronization signal HSYNC_X may correspond to the first vertical synchronization signal VSYNC1 and the first horizontal synchronization signal HSYNC1, respectively.

Meanwhile, since the data FDAT is not transmitted from the host processor 100 to the display driver 210 in the blank period BLANK, the data driver 210 may internally generate the second synchronization signal DSYNC to maintain synchronization with the host processor 100.

However, when the channel CH2 and the first synchronization signal XSYNC provided through the second channel CH2 shown in FIGS. 1 and 2 does not exist, the data driver 210 may generate a synchronization signal based on an internal oscillator in the blank period BLANK. In this case, an error may occur in the second synchronization signal DSYNC (in particular, the horizontal synchronization signal) due to jitter and an error of the internal oscillator. In particular, as the blank period BLANK increases, an accumulated error of the second synchronization signal DSYNC may increase. Therefore, the synchronization between the host processor 100 and the display driver 210 may not be accurately performed, and the image may not be displayed properly in a next frame period. That is, accurate synchronization between the host processor 100 and the display driver 210 may be difficult using only the internal oscillator (or a synchronization signal generated by the oscillator) of the data driver 210.

Therefore, as shown in FIG. 14, the display system 10 may continuously maintain the synchronization between host processor 100 and the display drivers 210 by using the first synchronization signal XSYNC having a waveform toggled in the entire frame period including a variable front porch period ΔVFP. The variable front porch period ΔVFP may mean a variable portion of the front porch period VFP of the blank period BLANK of FIG. 14.

Meanwhile, a tearing effect signal TE may indicate a display status, and for example, the tearing effect signal TE may transition to a low level in the active period ACTIVE of FIG. 12 and may transition to a high level in the blank period BLANK of FIG. 12, but is not limited thereto.

Figure 15:
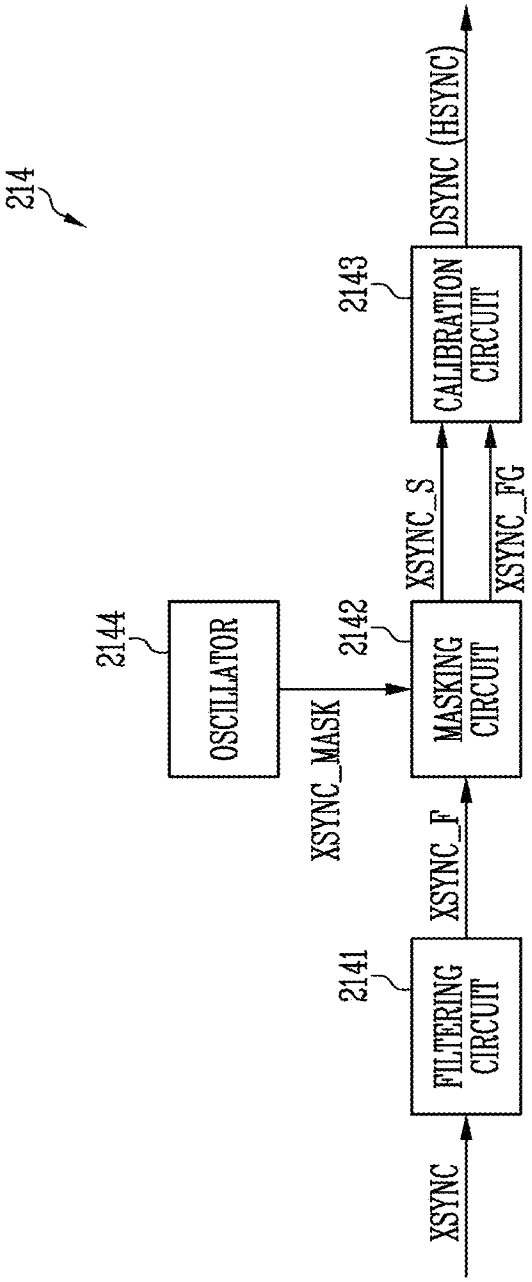
FIG. 15 is a diagram illustrating an embodiment of a calibrator included in a display driver of the display system of FIG. 2.
Figure 16:
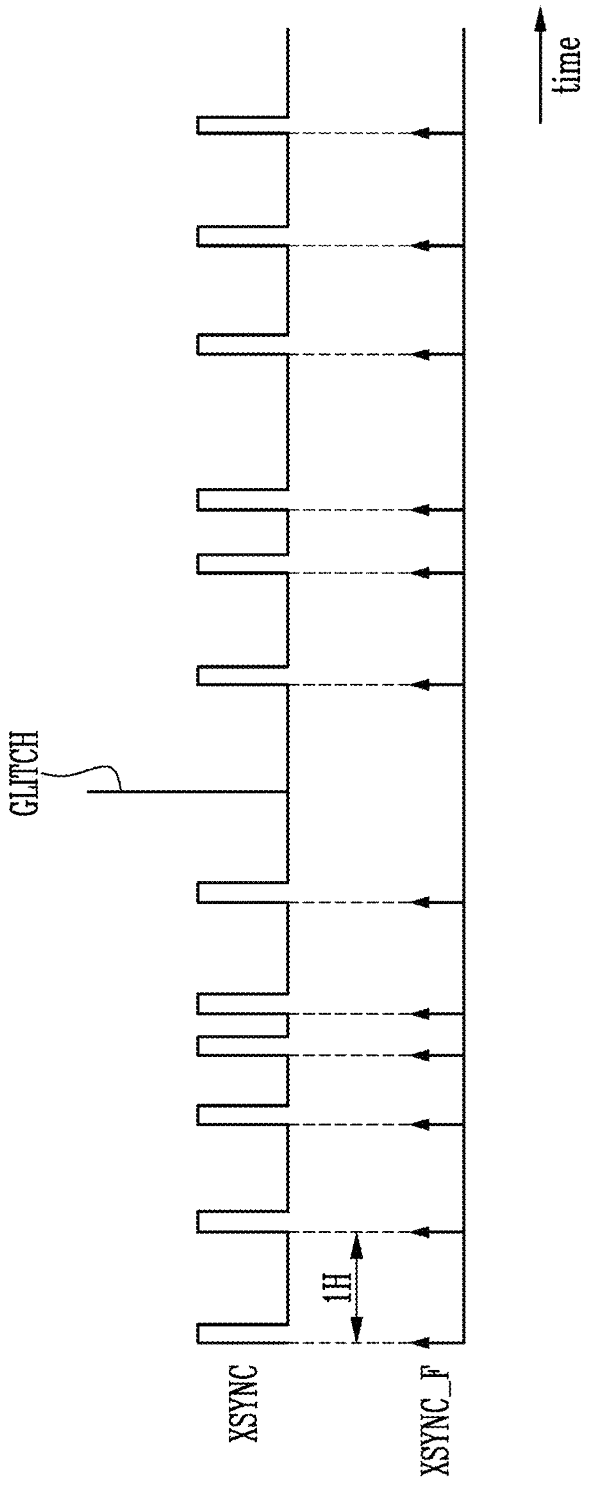
FIG. 16 is a diagram illustrating an operation of a filtering circuit of the calibrator of FIG. 15.
Figure 17:
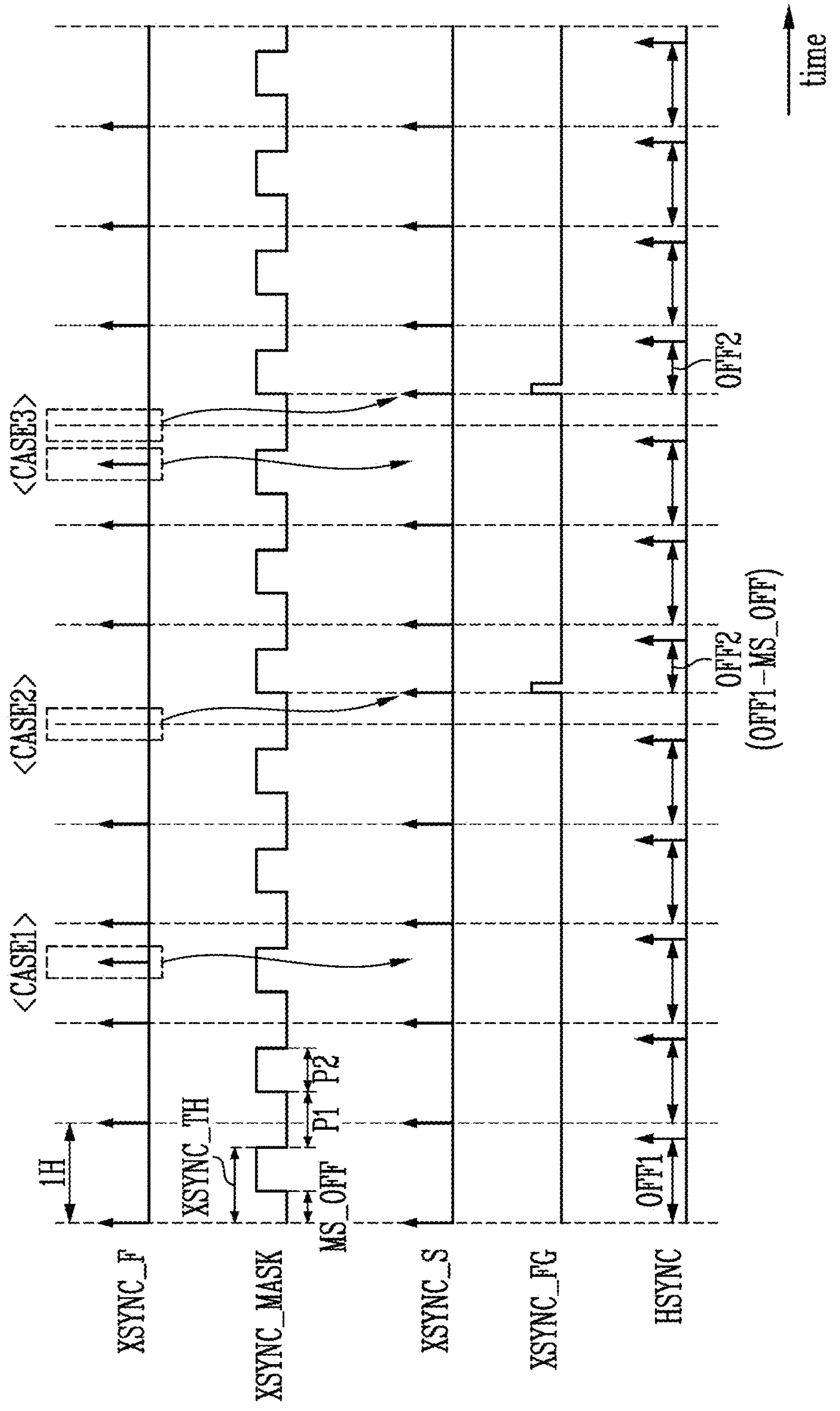
FIG. 17 is a diagram illustrating an operation of a masking circuit and a calibration circuit of the calibrator of FIG. 15.

FIG. 15 is a diagram illustrating an embodiment of the calibrator included in the display driver of the display system of FIG. 2. FIG. 16 is a diagram illustrating an operation of a filtering circuit of the calibrator of FIG. 15. FIG. 17 is a diagram illustrating an operation of a masking circuit and a calibration circuit of the calibrator of FIG. 15.

Referring to FIGS. 1, 2, 15, 16, and 17, the calibrator 214 may generate the horizontal synchronization signal HSYNC by calibrating or delaying pulses of the first synchronization signal XSYNC using offsets. The horizontal synchronization signal HSYNC may be included in the second synchronization signal DSYNC.

The calibrator 214 may include the masking circuit 2142 (or a masking block) and the calibration circuit 2143 (or a calibration block). In addition, the calibrator 214 may further include the filtering circuit 2141 (or a filtering block) and an oscillator 2144 (a mask signal generation circuit, or a mask signal generation block).

The filtering circuit 2141 may remove noise from the first synchronization signal XSYNC to output a filtered synchronization signal XSYNC_F. In a process in which the first synchronization signal XSYNC is transmitted from the host processor 100 to the display driver 210 through the second channel CH2, noise may be generated/inserted into the first synchronization signal XSYNC. Referring to FIG. 16, for example, even though the host processor 100 transmits the first synchronization signal XSYNC having a constant period of 1 horizontal time 1H, a glitch GLITCH (for example, an overshoot) out of a signal range (or a voltage range) may occur in the first synchronization signal XSYNC received by the display driver 210, or a phenomenon in which a timing of a pulse of the first synchronization signal XSYNC deviates may occur. The filtering circuit 2141 may output the filtered synchronization signal XSYNC_F by removing the glitch GLITCH out of a preset signal range. For example, the filtering circuit 2141 may be implemented as a glitch removal circuit for a data receiver. According to an embodiment, the filtering circuit 2141 may be omitted or may be included in the masking circuit 2142.

Meanwhile, for convenience of description, in FIGS. 16 and 17, the filtered synchronization signal XSYNC_F is shown to have a pulse (an impulse, or a shot) corresponding to a rising edge of the first synchronization signal XSYNC. This is for accurately expressing a timing of pulses of the first synchronization signal XSYNC, and the filtered synchronization signal XSYNC_F is not limited thereto. For example, the filtered synchronization signal XSYNC_F may have a pulse (or a shot) corresponding to a falling edge of the first synchronization signal XSYNC, or may have a pulse of a specific width corresponding to the pulse of the first synchronization signal XSYNC.

The masking circuit 2142 may generate or output a third synchronization signal XSYNC_S including one pulse in one horizontal time (or 1 horizontal time 1H by removing noise from the filtered synchronization signal XSYNC_F (or the first synchronization signal XSYNC) or inserting/adding a pulse through a masking operation using a mask signal XSYNC_MASK (a masking signal, a masking reference signal, a reference signal, and a clock signal). The mask signal XSYNC_MASK may be generated inside the display driver 210 and may be provided from, for example, the oscillator 2144.

Referring to FIG. 17, the mask signal XSYNC_MASK may have a period of 1 horizontal time 1H, have a first level (for example, a low level) in a first period P1, and have a second level (for example, a high level) in a second period P2. The first period P1 and the second period P2 may be included in one period. The second period P2 may be referred to as a masking period or a masking region. The first period P1 may be a period except for or outside the second period P2.

In an embodiment, first and second information MS_OFF and XSYNC_TH, which previously define a start time point and an end time point of the second period P2 of the mask signal XSYNC_MASK, may be pre-stored in a register of the display driver 210, and the mask signal XSYNC_MASK may be generated based on the first and second information. For example, based on a pulse of the filtered synchronization signal XSYNC_F, the first information MS_OFF may define the start time point of the second period P2, and the second information XSYNC_TH may define the end time point of the second period P2. For example, the first information MS_OFF may have a value corresponding to a time from a time point when the pulse of the synchronization signal XSYNC_F is generated to the start time point of the second period P2, and the second information XSYNC_TH may have a value corresponding to a time from the time point when the pulse of the synchronization signal XSYNC_F is generated to the end time point of the second period P2. Each of the first and second information MS_OFF and XSYNC_TH may be a X-bits of a digital value, but is not limited thereto. X may be a positive integer.

The masking circuit 2142 may bypass the pulse of the filtered synchronization signal XSYNC_F (or the first synchronization signal XSYNC) in the first period P1, and mask the pulse of the filtered synchronization signal XSYNC_F (or the first synchronization signal XSYNC) in the second period P2.

For example, referring to a first case CASE1 of FIG. 17, the filtered synchronization signal XSYNC_F may have the pulse, the masking circuit 2142 may ignore or skip the pulse, and the pulse is not reflected in the third synchronization signal XSYNC_S.

In addition, when the pulse is not present in/not generated in the filtered synchronization signal XSYNC_F (or the first synchronization signal XSYNC) during the first period P1, the masking circuit 2142 may insert/add a pulse to the third synchronization signal XSYNC_S at or after the end time point of the first period P1.

For example, referring to a second case CASE2 of FIG. 17, a pulse is not present/generated in the filtered synchronization signal XSYNC_F during the first period P1, and the masking circuit 2142 may insert a pulse into the third synchronization signal XSYNC_S at a rising edge (that is, at an end time point of the first period P1 and at the start time point of the second period P2) of the mask signal XSYNC_MASK).

In an embodiment, in the second case CASE2, the masking circuit 2142 may generate a flag signal XSYNC_FG in response to the pulse inserted into the third synchronization signal XSYNC_S. For example, as shown in FIG. 17, at a time point when a new pulse is inserted into the third synchronization signal XSYNC_S compared to the filtered synchronization signal XSYNC_F, the flag signal XSYNC_FG may have a high level of pulse. That is, when the first synchronization signal XSYNC (or the pulse of the first synchronization signal XSYNC) is not provided from an outside and the third synchronization signal XSYNC_S (or the pulse of the third synchronization signal XSYNC_S) is generated arbitrarily inside the display driver 210, the flag signal XSYNC_FG may be generated (also referred to as "flag on").

Meanwhile, referring to a third case CASE3 of FIG. 17, the filtered synchronization signal XSYNC_F has the pulse in the second period P2, and the pulse is not present/generated in the filtered synchronization signal XSYNC_F during the first period P1. In this case, similarly to an operation in the first case CASE1 and the second case CASE2, the masking circuit 2142 may skip the pulse in the second period P2 and insert the pulse into the third synchronization signal XSYNC_S at the end time point of the first period P1.

The third synchronization signal XSYNC_S generated by the masking circuit 2142 may include only one pulse (or shot) for each 1 horizontal time period 1H. However, since the third synchronization signal XSYNC_S has the pulse (for example, the pulse inserted at the end time point of the first period P1 or the start time point of the second period P2), inserted in an abnormal situation such as the second case CASE2 in addition to a normally filtered pulse during the first period P1, a period of the third synchronization signal XSYNC_S may not be constant. Therefore, to finally output a synchronization signal having a constant period, the calibration circuit 2143 performs calibration on the third synchronization signal XSYNC_S.

The calibration circuit 2143 may generate/output the second synchronization signal DSYNC (or the horizontal synchronization signal HSYNC) having a constant period through offset calibration for the third synchronization signal XSYNC_S.

In an embodiment, the calibration circuit 2143 may generate the horizontal synchronization signal HSYNC by delaying a bypassed pulse among the pulses of the third synchronization signal XSYNC_S by a time corresponding to a first offset OFF1 and delaying the inserted pulse among the pulses of the third synchronization signal XSYNC_S by a time corresponding to a second offset OFF2. In other words, the calibration circuit 2143 may generate a pulse at a time point elapsed by the time corresponding to the first offset OFF1 from a time point when the bypassed pulse is generated with respect to the bypassed pulse, and generate a pulse at a time point elapsed by the time corresponding to the second offset OFF2 from a time point when the inserted pulse is generated with respect to the inserted pulse. Here, the bypassed pulse may be a normal pulse, and the inserted pulse may be a pulse inserted in an abnormal situation such as the second case CASE2. The second offset OFF2 may be different from the first offset OFF1. For example, the second offset OFF2 may have a value the same as a value obtained by subtracting the first information MS_OFF (or a third offset) from the first offset OFF1. The first offset OFF1 (and the second offset OFF2) may be pre-stored in a register.

For example, the calibration circuit 2143 may delay the pulses of the third synchronization signal XSYNC_S by the time corresponding to the first offset OFF1, and may delay the corresponding pulse (that is, a pulse corresponding to the flag signal XSYNC_FG) of the third synchronization signal XSYNC_S by the time corresponding to the second offset OFF2 in response to a pulse of the flag signal XSYNC_FG.

Referring to FIG. 15 again, the oscillator 2144 may generate the mask signal XSYNC_MASK. For example, the oscillator 2144 may be implemented as a ring oscillator, an RC oscillator, a crystal oscillator, a temperature compensation crystal oscillator, or the like.

Meanwhile, since the mask signal XSYNC_MASK is generated internally by the oscillator 2144, that is, the display driver 210, the mask signal XSYNC_MASK may have jitter or an error, but an error may not occur substantially in the third synchronization signal XSYNC_S generated based on the mask signal XSYNC_MASK. This is because the third synchronization signal XSYNC_S is not generated based on only the mask signal XSYNC_MASK but a combination of the mask signal XSYNC_MASK and the filtered synchronization signal XSYNC_F (or the first synchronization signal XSYNC).

As described above, the calibrator 214 may generate the horizontal synchronization signal HSYNC (and the second synchronization signal DSYNC including the same) having a constant period through offset calibration for the first synchronization signal XSYNC.

Meanwhile, in FIGS. 16 and 17, a period or an average period of the first synchronization signal XSYNC is shown as 1 horizontal time period 1H, which is the same as a period of the horizontal synchronization signal HSYNC, but the disclosure is not limited thereto, and the period or the average period of the first synchronization signal XSYNC may be greater than or less than 1 horizontal time period 1H.

Figure 18:
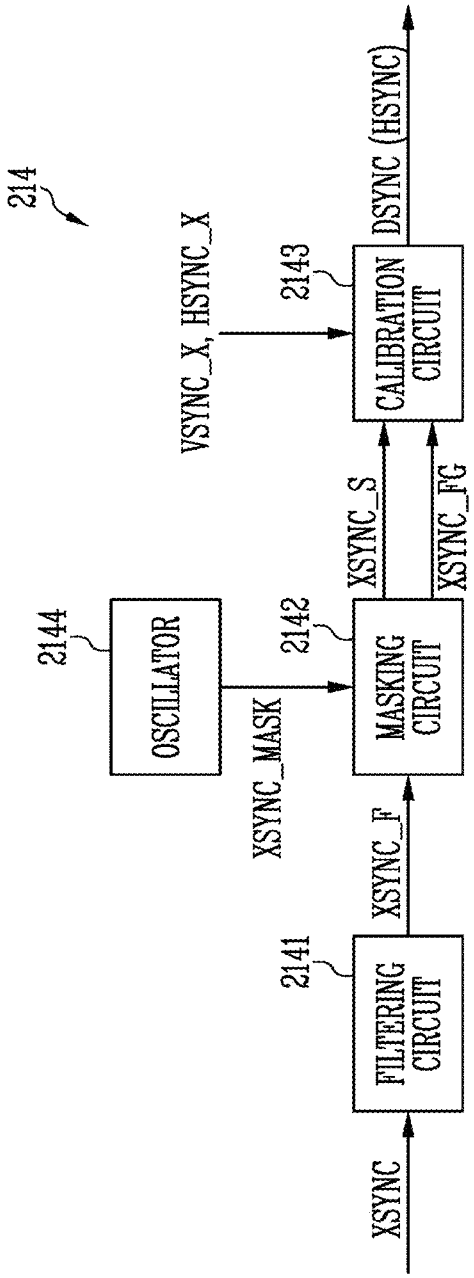
FIG. 18 is a diagram illustrating an embodiment of the calibrator included in the display driver of the display system of FIG. 2.
Figure 19:
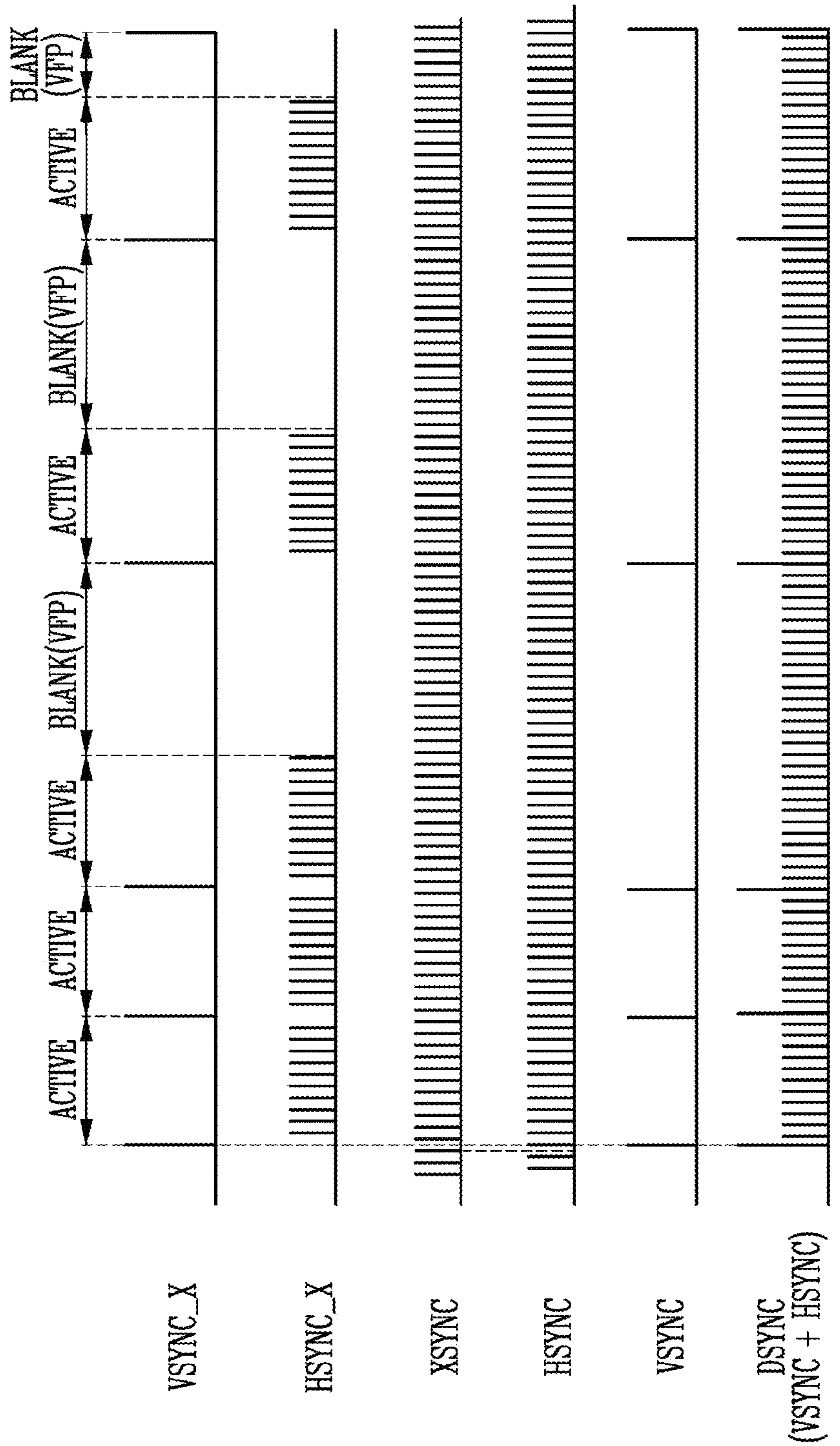
FIG. 19 is a diagram illustrating an operation of the calibration circuit of the calibrator of FIG. 18.

FIG. 18 is a diagram illustrating another embodiment of the calibrator included in the display driver of the display system of FIG. 2. FIG. 19 is a diagram illustrating an operation of the calibration circuit of the calibrator of FIG. 18.

Referring to FIGS. 13 and 15 to 19, the calibrator 214 may generate the second synchronization signal DSYNC by synchronizing the external horizontal synchronization signal HSYNC_X and the external vertical synchronization signal VSYNC_X with the horizontal synchronization signal HSYNC.

For example, as described with reference to FIG. 13, the display driver 210 may recover or generate the external vertical synchronization signal VSYNC_X and the external horizontal synchronization signal HSYNC_X based on information on the synchronization signal included in the data FDAT. For example, the external vertical synchronization signal VSYNC_X and the external horizontal synchronization signal HSYNC_X may be recovered or generated in the receiver 211 or the timing controller 212 of FIG. 2, and the external vertical synchronization signal VSYNC_X and the external horizontal synchronization signal VSYNC_X may be provided to the calibration circuit 2143.

The external vertical synchronization signal VSYNC_X and the external horizontal synchronization signal HSYNC_X of FIG. 19 may be substantially the same as the external vertical synchronization signal VSYNC_X and the external horizontal synchronization signal HSYNC_X of FIG. 13.

As described with reference to FIGS. 15 to 17, the calibration circuit 2143 may generate the horizontal synchronization signal HSYNC having a constant period from the first synchronization signal XSYNC.

The calibration circuit 2143 may generate the vertical synchronization signal VSYNC by synchronizing the external vertical synchronization signal VSYNC_X with the horizontal synchronization signal HSYNC. Therefore, the second synchronization signal DSYNC including the horizontal synchronization signal HSYNC and the vertical synchronization signal VSYNC may be generated, and the second synchronization signal DSYNC may have a constant period also in the blank period BLANK (or the front porch period VFP). That is, accurate synchronization between the host processor 100 and the display driver 210 may be performed or the synchronization may be continuously maintained also in the blank period BLANK.

Figure 20:
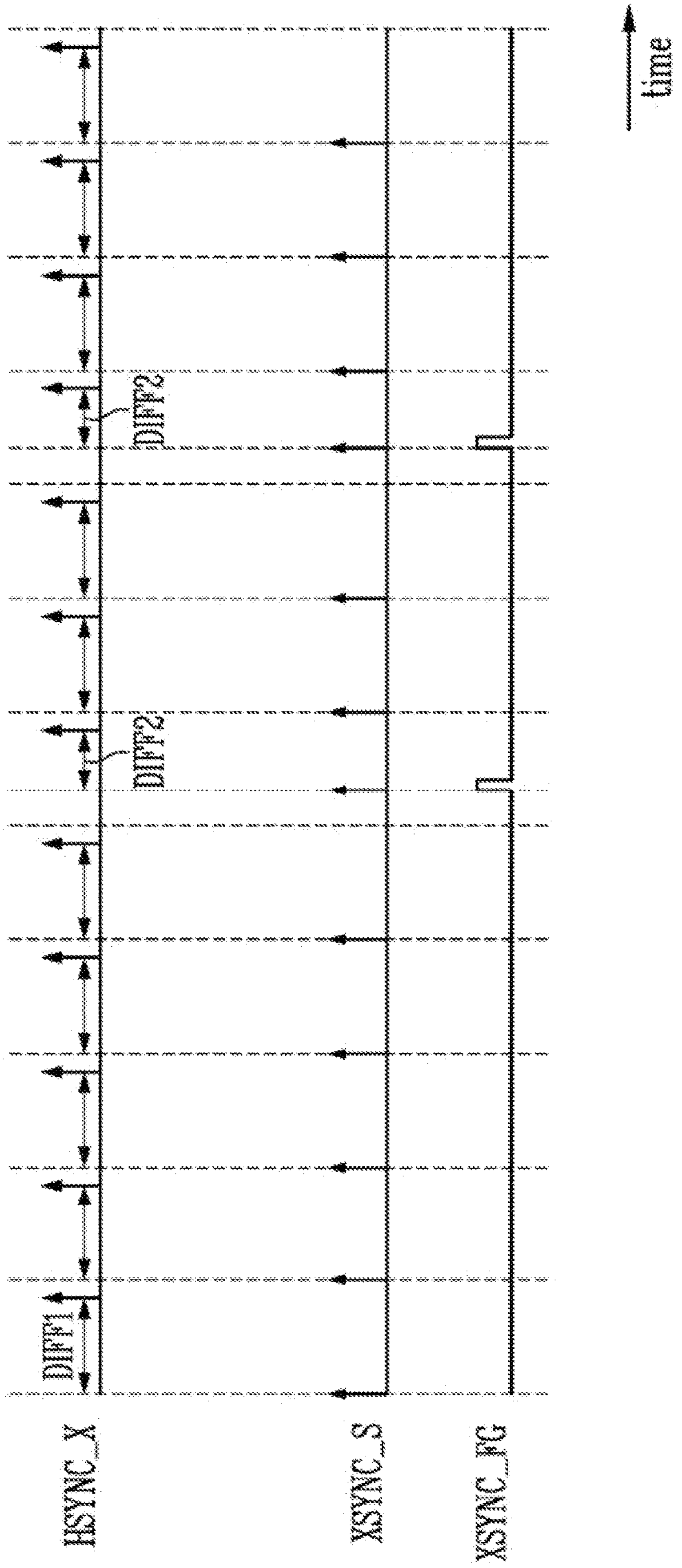
FIG. 20 is a diagram illustrating signals generated by the display driver of FIG. 2.

FIG. 20 is a diagram illustrating signals generated by the display driver of FIG. 2.

Referring to FIGS. 2 and 15 to 20, the external horizontal synchronization signal HSYNC_X may be substantially the same as or similar to the external horizontal synchronization signal HSYNC_X of FIG. 19, and the third synchronization signal XSYNC_S and the flag signal XSYNC_FG may be substantially the same as or similar to the third synchronization signal XSYNC_S and the flag signal XSYNC_FG of FIG. 17. Therefore, an overlapping description is not repeated.

In embodiments, the display driver 210 (or the calibrator 214) may set the first offset OFF1 and the second offset OFF2 of FIG. 17 based on the external horizontal synchronization signal HSYNC_X and the third synchronization signal XSYNC_S in the active period ACTIVE (refer to FIG. 19).

In an embodiment, the external horizontal synchronization signal HSYNC_X may have a first difference DIFF1 based on the third synchronization signal XSYNC_S in the active period ACTIVE (refer to FIG. 19). In this case, the display driver 210 (or the calibrator 214) may set the first offset OFF1 by learning the first difference DIFF1. For example, the display driver 210 (or the calibrator 214) may calculate the first difference DIFF1 for each horizontal period. For example, the display driver 210 (or the calibrator 214) may calculate the first difference DIFF1 by counting the number of pulses of an internal clock signal during a period corresponding to the first difference DIFF1. For example, the display driver 210 (or the calibrator 214) may set the first offset OFF1 based on an average of the first differences DIFF1. As another example, the display driver 210 (or the calibrator 214) may set the first offset OFF1 based on a median value of the first difference DIFF1.

In another embodiment, when a pulse is generated in the flag signal XSYNC_FG, the external horizontal synchronization signal HSYNC_X may have a second difference DIFF2 based on the third synchronization signal XSYNC_S. In this case, the display driver 210 (or the calibrator 214) may set the second offset OFF2 by learning the second difference DIFF2. A method of setting the second offset OFF2 may be substantially the same as a method of setting the first offset OFF1.

According to an embodiment, the display driver 210 may set the first information MS_OFF and the second information XSYNC_TH defining the start time point and the end time point of the mask signal XSYNC_MASK of FIG. 17 based on the first offset OFF1 and the second offset OFF2.

Through the above process, the first offset OFF1 and the second offset OFF2 (the first information MS_OFF and the second information XSYNC_TH according to an embodiment) may be optimized, and the horizontal synchronization signal HSYNC (refer to FIG. 17) generated based on the first offset OFF1 and the second offset OFF2 may have a more constant period. That is, more accurate synchronization between the host processor 100 and the display driver 210 may be performed.

Figure 21:
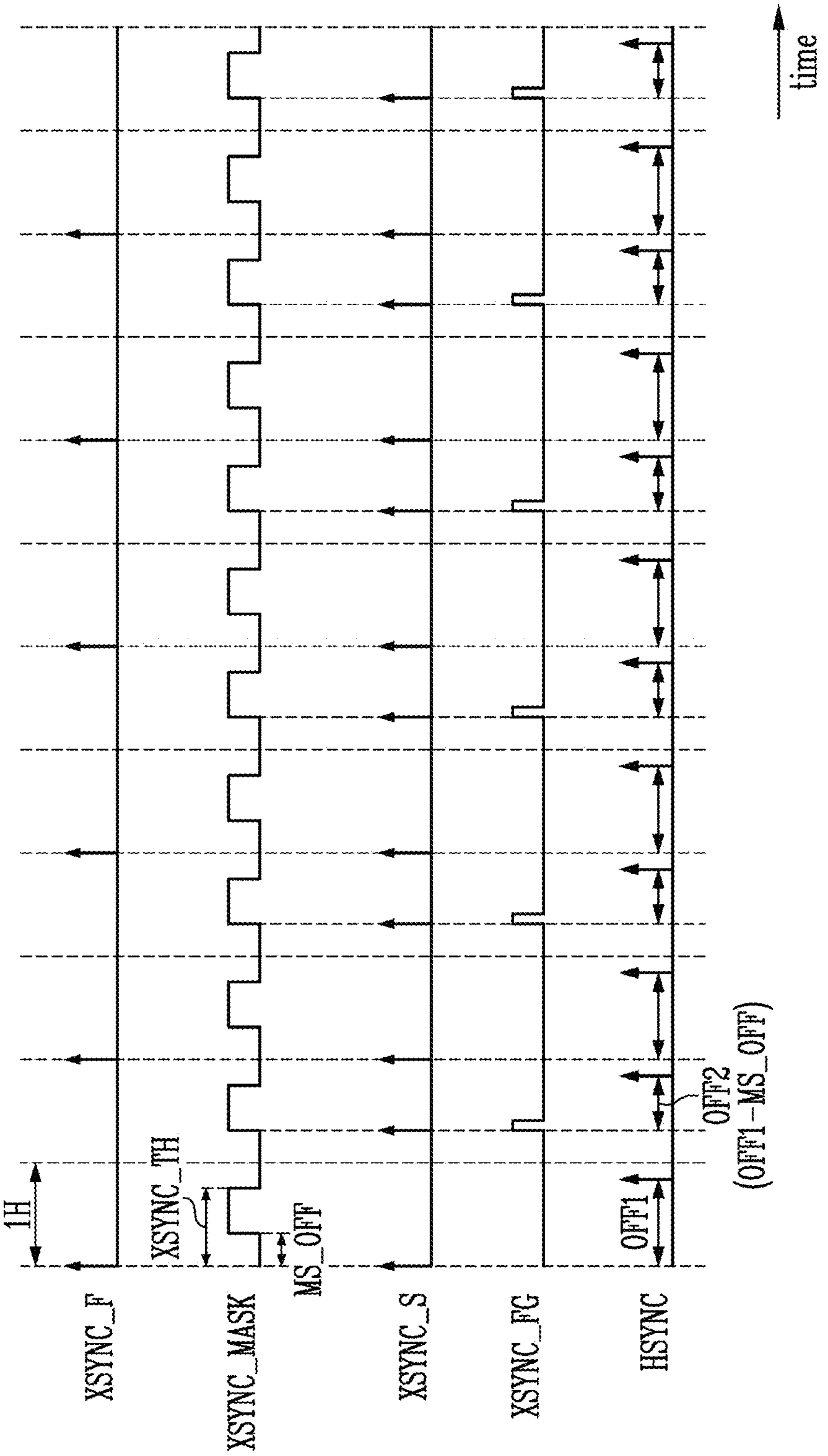
FIG. 21 is a diagram illustrating an embodiment of an operation of the calibrator of FIG. 15.

FIG. 21 is a diagram illustrating an embodiment of an operation of the calibrator of FIG. 15.

Referring to FIGS. 15, 17, and 21, the period (or the average period) of the first synchronization signal XSYNC may be greater than the period of the horizontal synchronization signal HSYNC, that is, 1 horizontal time period 1H. It is assumed that the period (or the average period) of the first synchronization signal XSYNC is 2 horizontal times.

In this case, as shown in FIG. 21, an average period of the filtered synchronization signal XSYNC_F may also be 2 horizontal times.

As in the second case CASE2 of FIG. 17, when a pulse is not present/generated in the filtered synchronization signal XSYNC_F during the first period P1, the pulse may be inserted into the third synchronization signal XSYNC_S at the rising edge of the mask signal XSYNC_MASK (that is, at the end time point of the first period P1 and the start time point of the second period P2). In addition, the flag signal XSYNC_FG may have a pulse corresponding to the inserted pulse. Through this, the third synchronization signal XSYNC_S may include one pulse (or shot) for each 1 horizontal time period 1H.

Through the offset calibration for the third synchronization signal XSYNC_S described with reference to FIG. 17, the horizontal synchronization signal HSYNC having a constant period may be generated from the third synchronization signal XSYNC_S.

As described above, even in a case in which the period (or the average period) of the first synchronization signal XSYNC is greater than 1 horizontal time period 1H, the horizontal synchronization signal HSYNC having a constant period of 1 horizontal time period 1H may be generated.

Figure 22:
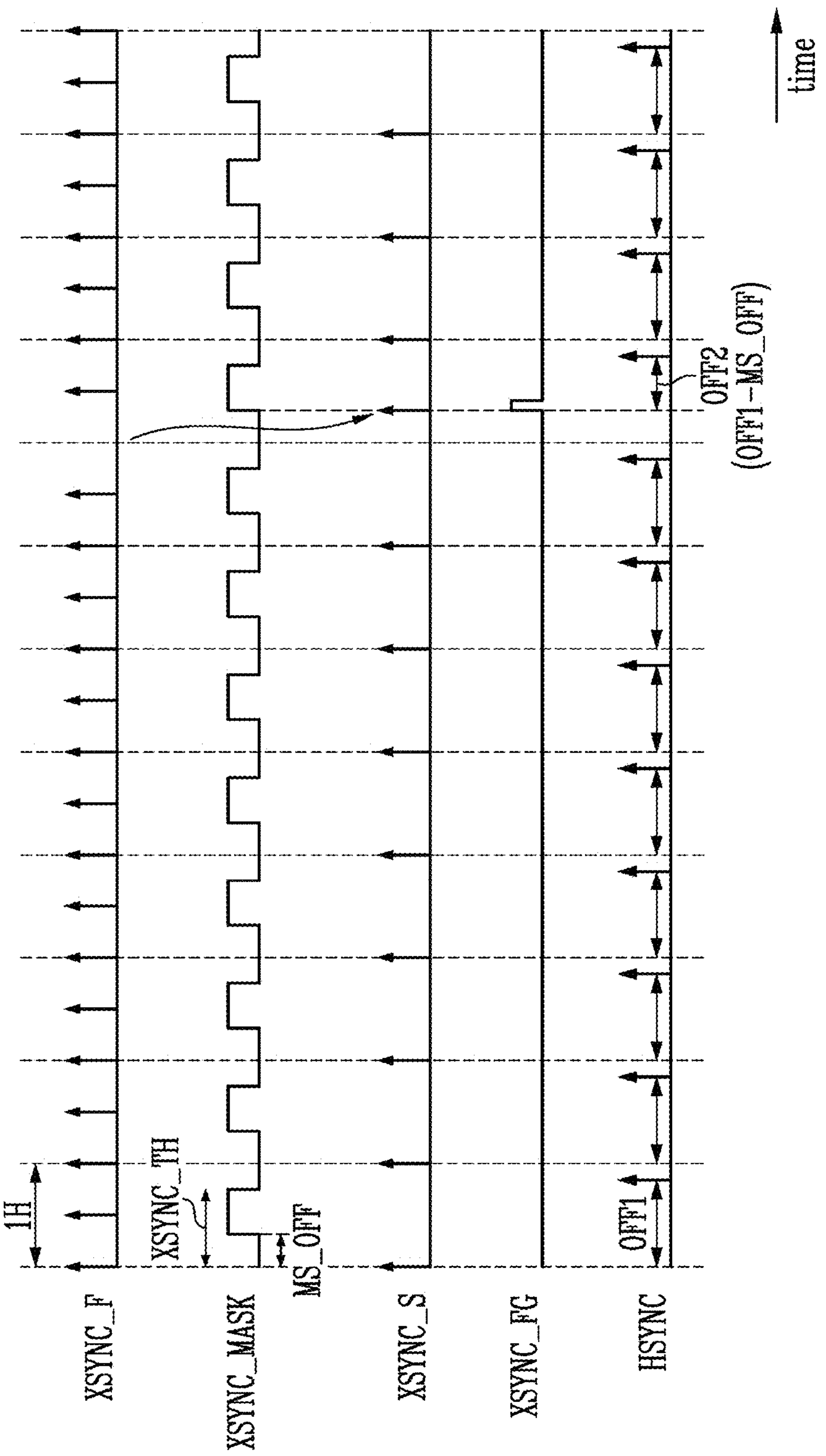
FIG. 22 is a diagram illustrating an embodiment of the operation of the calibrator of FIG. 15.

FIG. 22 is a diagram illustrating another embodiment of the operation of the calibrator of FIG. 15.

Referring to FIGS. 15, 17, and 22, the period (or the average period) of the first synchronization signal XSYNC may be less than the period of the horizontal synchronization signal HSYNC, that is, 1 horizontal time period 1H. It is assumed that the period (or the average period) of the first synchronization signal XSYNC is ½ horizontal times.

In this case, as shown in FIG. 22, the average period of the filtered synchronization signal XSYNC_F may also be ½ horizontal times.

As in the first case CASE1 of FIG. 17, when the filtered synchronization signal XSYNC_F has the pulse in the second period P2, the pulse is skipped and not reflected in the third synchronization signal XSYNC_S.

In addition, as in the second case CASE2 of FIG. 17, when a pulse is not present/generated in the filtered synchronization signal XSYNC_F during the first period P1, the pulse may be inserted into the third synchronization signal XSYNC_S at the rising edge of the mask signal XSYNC_MASK (that is, at the end time point of the first period P1 and the start time point of the second period P2). Through this, the third synchronization signal XSYNC_S may include one pulse (or shot) for each 1 horizontal time period 1H.

Through the offset calibration for the third synchronization signal XSYNC_S described with reference to FIG. 17, the horizontal synchronization signal HSYNC having a constant period may be generated from the third synchronization signal XSYNC_S.

As described above, even in a case in which the period (or the average period) of the first synchronization signal XSYNC is less than 1 horizontal time period 1H, the horizontal synchronization signal HSYNC having a constant period of 1 horizontal time period 1H may be generated.

Figure 23:
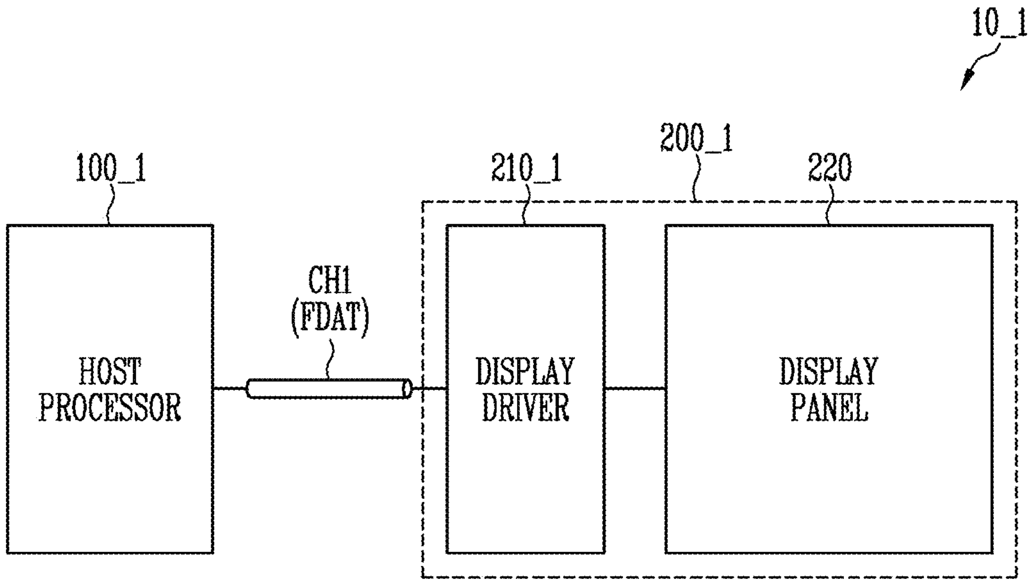
FIG. 23 is a diagram illustrating a display system according to other embodiments of the disclosure.
Figure 24:
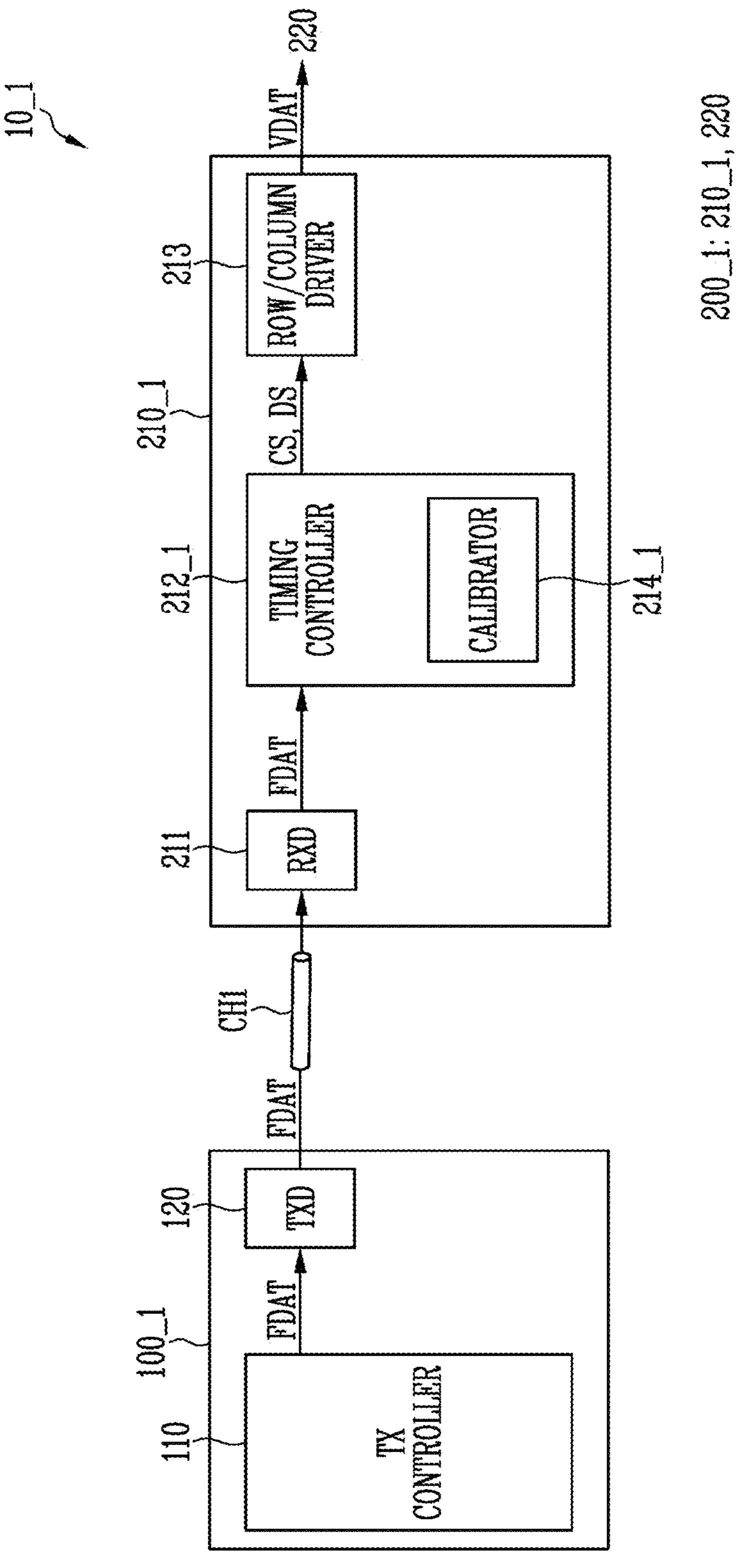
FIG. 24 is a diagram illustrating an embodiment of the display system of FIG. 23.
Figure 25:
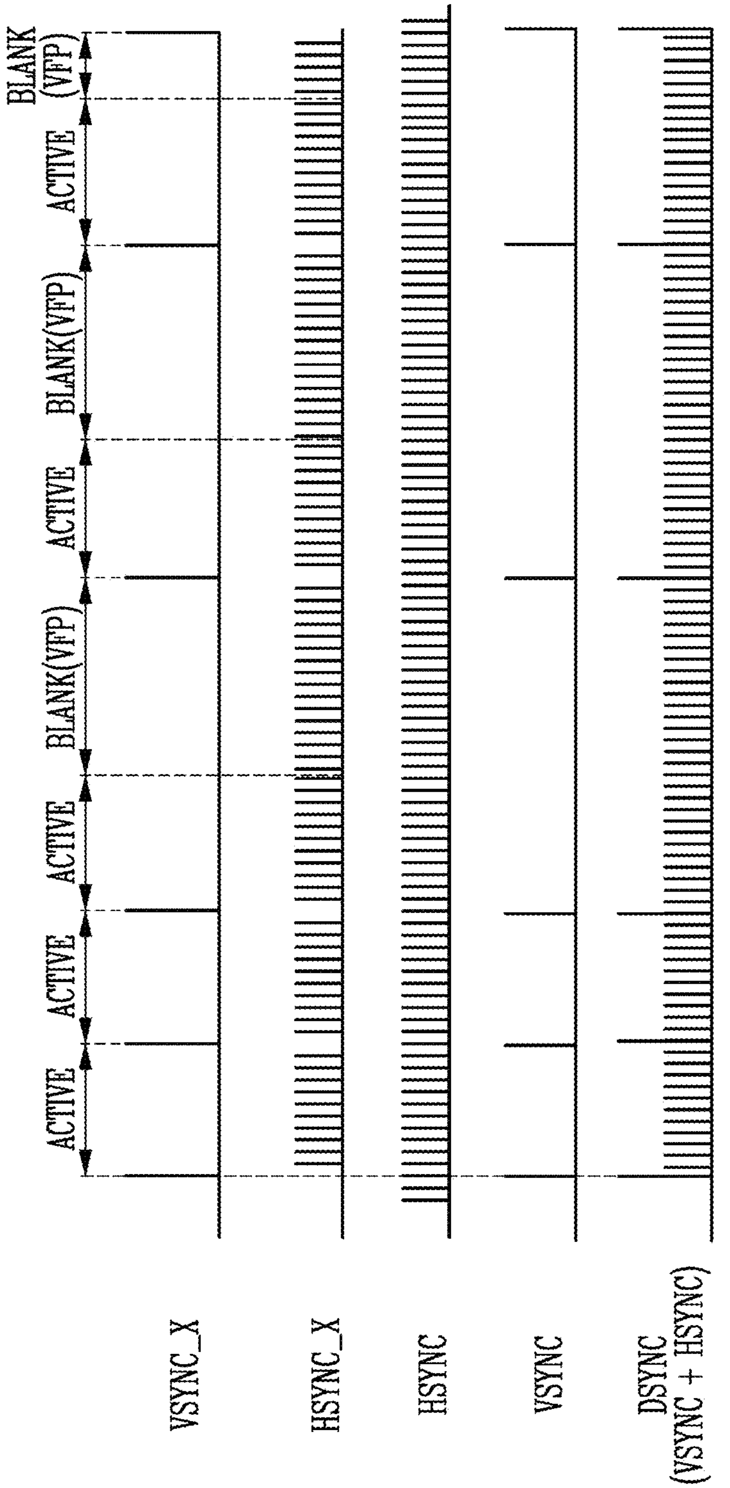
FIG. 25 is a diagram illustrating an operation of a display driver included in the display system of FIG. 23.

FIG. 23 is a diagram illustrating a display system according to an embodiment of the disclosure. FIG. 24 is a diagram illustrating an embodiment of the display system of FIG. 23. FIG. 25 is a diagram illustrating an operation of a display driver included in the display system of FIG. 23.

Referring to FIGS. 1, 2, 19, and 23 to 25, the display system 10_1 of FIGS. 23 and 24 does not include the second channel CH2 (and the first synchronization signal XSYNC transmitted therethrough). In an embodiment, the external horizontal synchronization signal HSYNC_X of FIG. 25 has a pulse even in the blank period BLANK (or the front porch period VFP). Except for the above difference, the embodiments of FIGS. 23 to 25 are substantially the same as or similar to the above-described embodiments (for example, the embodiments of FIGS. 1, 2, and 19), and thus an overlapping description is not repeated.

The host processor 100_1 may include information on the synchronization signal in the data FDAT and transmit the information to the display device 2001 (or the display driver 210_1). In particular, the host processor 100_1 may transmit the information on the synchronization signal not only in the active period ACTIVE but also in the blank period BLANK. For synchronization between the host processor 100_1 and the display driver 210_1, the host processor 100_1 may continuously output the information on the synchronization signal instead of the separate first synchronization signal XSYNC1 (refer to FIG. 2).

The display driver 210_1 may generate the external vertical synchronization signal VSYNC_X and the external horizontal synchronization signal HSYNC_X based on the information, generate the second synchronization signal DSYNC based on the external vertical synchronization signal VSYNC_X and the external horizontal synchronization signal HSYNC_X, and maintain the synchronization with the host processor 100 based on the second synchronization signal DSYNC.

As described with reference to FIG. 24, a timing controller 212_1 (or the receiver 211) may recover or generate the external vertical synchronization signal VSYNC_X and the external horizontal synchronization signal HSYNC_X based on the information on the synchronization signal.

A calibrator 214_1 may generate the horizontal synchronization signal HSYNC having a constant period by performing the offset calibration described with reference to FIGS. 15 to 17 on the external horizontal synchronization signal HSYNC_X (instead of the first synchronization signal XSYNC of FIG. 15).

In addition, as described with reference to FIG. 19, the calibrator 214_1 may generate the vertical synchronization signal VSYNC by synchronizing the external vertical synchronization signal VSYNC_X with the horizontal synchronization signal HSYNC. Therefore, the second synchronization signal DSYNC including the horizontal synchronization signal HSYNC and the vertical synchronization signal VSYNC may be generated, and the second synchronization signal DSYNC may have a constant period in the entire frame period. That is, accurate synchronization may be performed or the synchronization may be continuously maintained between the host processor 100_1 and the display driver 210_1 in the entire frame period.

Although the calibrator 214_1 is shown as being included in the timing controller 212_1 in FIG. 24, embodiments of the disclosure are not limited thereto. For example, the calibrator 214_1 may be implemented independently from the timing controller 212_1 (refer to FIG. 2).

Figure 26:
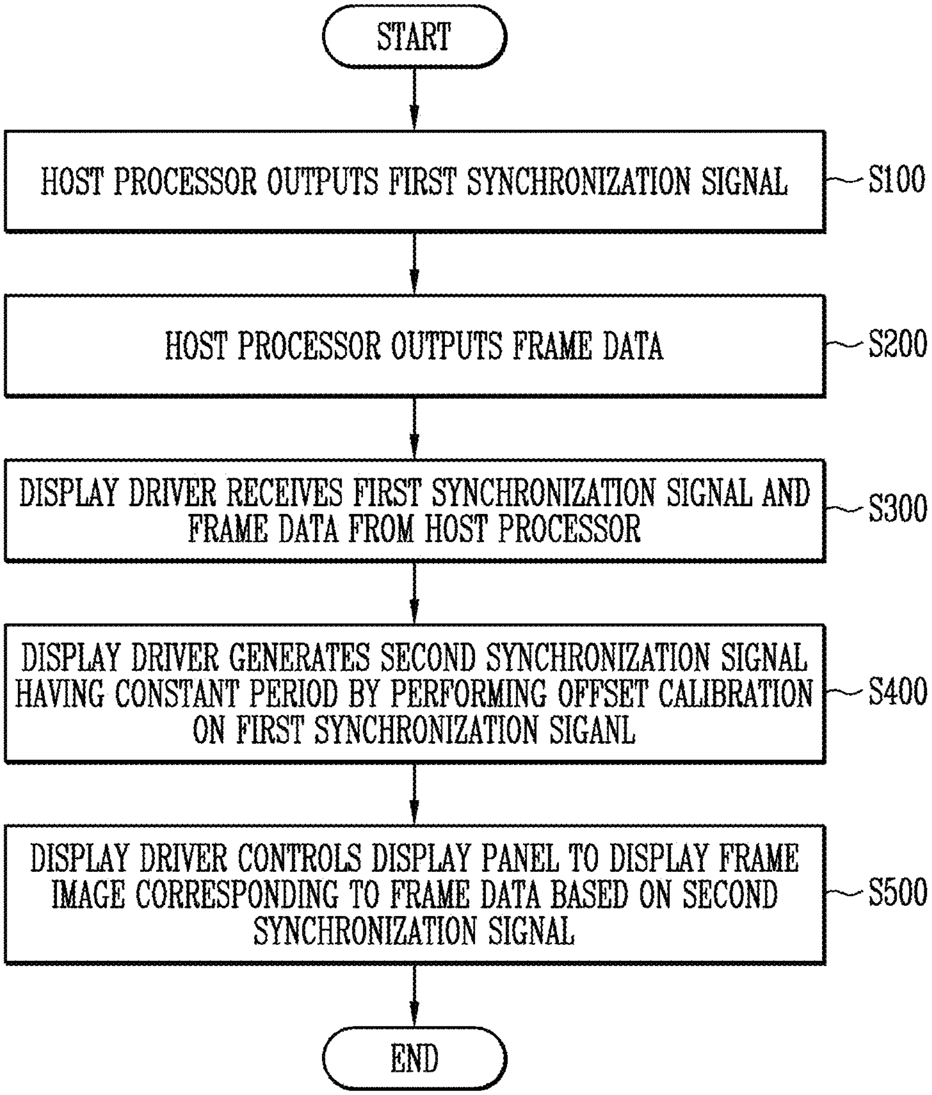
FIG. 26 is a flowchart illustrating a display control method according to embodiments of the disclosure.

FIG. 26 is a flowchart illustrating a display control method according to an embodiment of the disclosure.

Referring to FIGS. 1 and 26, the method of FIG. 26 may be performed in the display system 10 of FIG. 1. According to an embodiment, the method of FIG. 26 may also be performed in the display system 10_1 of FIG. 23.

The host processor 100 outputs the first synchronization signal XSYNC (S100). For example, the host processor 100 may output the first synchronization signal XSYNC through the second channel CH2. In addition, the host processor 100 may output the first synchronization signal XSYNC in the entire frame period including the blank period BLANK of FIG. 13.

The host processor 100 outputs the data FDAT (S200). For example, the host processor 100 may output the data FDAT through the first channel CH1. The host processor 100 may output the data FDAT only in the active period ACTIVE of FIG. 13.

The display driver 210 receives the first synchronization signal XSYNC and the data FDAT from the host processor 100 (S300).

Thereafter, the display driver 210 may control the display panel 220 to display the image corresponding to the data FDAT at a timing corresponding to the first synchronization signal XSYNC without storing the data FDAT.

In an embodiment, the display driver 210 generates the second synchronization signal DSYNC having a constant period by performing offset calibration on the first synchronization signal XSYNC (S400).

In an embodiment, the display driver 210 may generate the horizontal synchronization signal HSYNC through the offset calibration described with reference to FIGS. 15 to 17, and generate the second synchronization signal DSYNC through synchronization of the external vertical synchronization signal VSYNC_X and the horizontal synchronization signal HSYNC described with reference to FIGS. 18 and 19.

For example, the display driver 210 may generate the synchronization signal XSYNC_S including one pulse in one horizontal time by removing noise from the first synchronization signal XSYNC or inserting the pulse through the masking operation using the reference signal (for example, the mask signal XSYNC_MASK of FIG. 17), and generate the horizontal synchronization signal HSYNC from the third synchronization signal XSYNC_S based on the offsets.

Thereafter, the display driver 210 may control the display panel 220 to display the image (for example, the frame image) corresponding to the data FDAT based on the second synchronization signal DSYNC.

For example, the display driver 210 does not include a frame buffer for storing the data FDAT. Accordingly, the display driver 210 may generate the data signal VDAT (refer to FIG. 2) corresponding to the data FDAT in response to the second synchronization signal DSYNC without storing the data FDAT, and provide the data signal VDAT to the display panel 220.

As described above, the display system 10 that does not include a frame buffer for storing the data FDA may transmit the first synchronization signal XSYNC separate from the data FDA from the host processor 100 to the display driver 210. Though this, the synchronization between the host processor 100 and the display driver 210 may be maintained. In addition, the display driver 210 may generate the second synchronization signal DSYNC having a constant cycle or period through offset calibration for the first synchronization signal XSYNC. Therefore, more accurate synchronization between the host processor 100 and the display driver 210 may be performed based on the second synchronization signal DSYNC.

Figure 27:
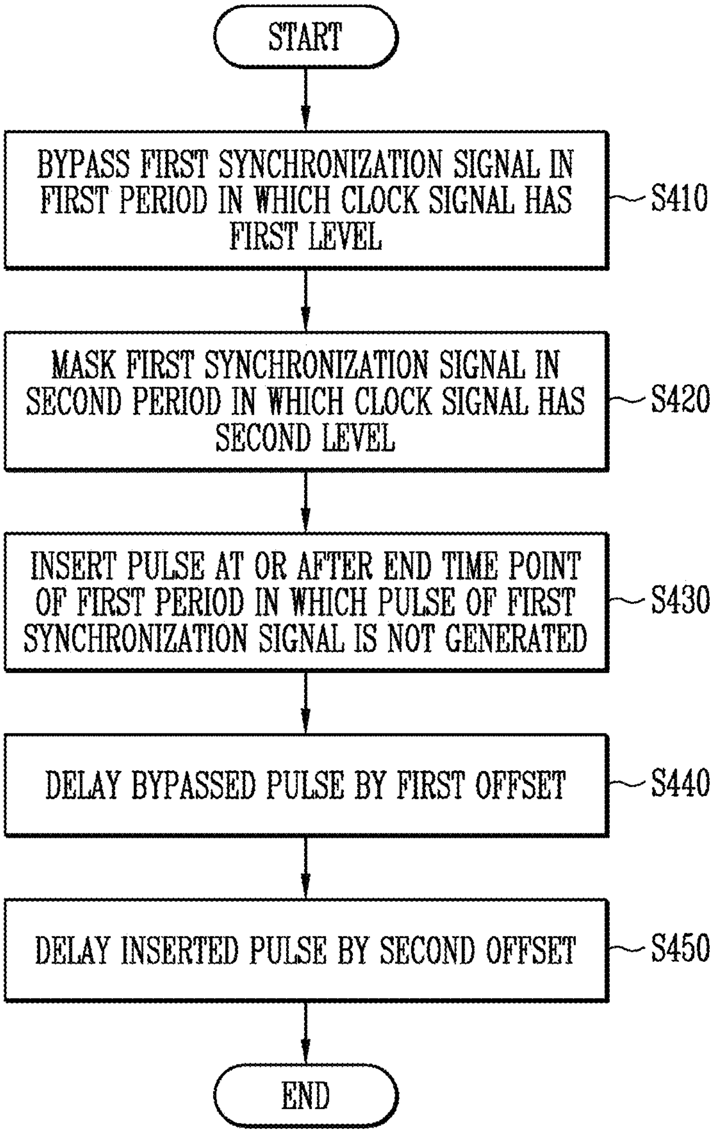
FIG. 27 is a flowchart illustrating a process in which a second synchronization signal is generated by the display control method of FIG. 26.

FIG. 27 is a flowchart illustrating a process in which the second synchronization signal is generated by the display control method of FIG. 26.

Referring to FIGS. 1 to 27, the display driver 210 bypasses the first synchronization signal XSYNC in the first period in which the clock signal has a first level (S410), and masks or skips the first synchronization signal XSYNC in the second period in which the clock signal has a second level (S420). In addition, when the pulse of the first synchronization signal XSYNC does not occur in the first period, a pulse is inserted/added at or after the end time point of the first period. Here, the clock signal may be the mask signal XSYNC_MASK described with reference to FIG. 17 and may have a period of 1 horizontal time (1H).

According to an embodiment, the display driver 210 may generate the filtered synchronization signal XSYNC_F by performing a filtering operation for removing noise from the first synchronization signal XSYNC. In this case, the display driver 210 may perform a masking operation on the filtered synchronization signal XSYNC_F.

For example, as described with reference to FIG. 17, the display driver 210 may bypass the pulse of the filtered synchronization signal XSYNC_F in the first period P1 and mask or skip the pulse of the filtered synchronization signal XSYNC_F in the second period P2. In addition, when the pulse of the filtered synchronization signal XSYNC_F does not occur in the first period P1 as in the second case CASE2 described with reference to FIG. 17, the pulse may be inserted/added at the end time point of the first period P1 or the start time point of the second period P2. Through this, the third synchronization signal XSYNC_S may be generated from the filtered synchronization signal XSYNC_F.

Thereafter, the display driver 210 delays the bypassed pulse by the time corresponding to the first offset OFF1 (S440), and delays the inserted/added pulse by the time corresponding to the second offset OFF2 (S450). Through this, the horizontal synchronization signal HSYNC may be generated.

For example, as described with reference to FIG. 17, the display driver 210 may generate the horizontal synchronization signal HSYNC by delaying the bypassed pulse among the pulses of the third synchronization signal XSYNC_S by the time corresponding to the first offset OFF1 and delaying the inserted pulse among the pulses of the third synchronization signal XSYNC_S by the time corresponding to the second offset OFF2.

Figure 28:
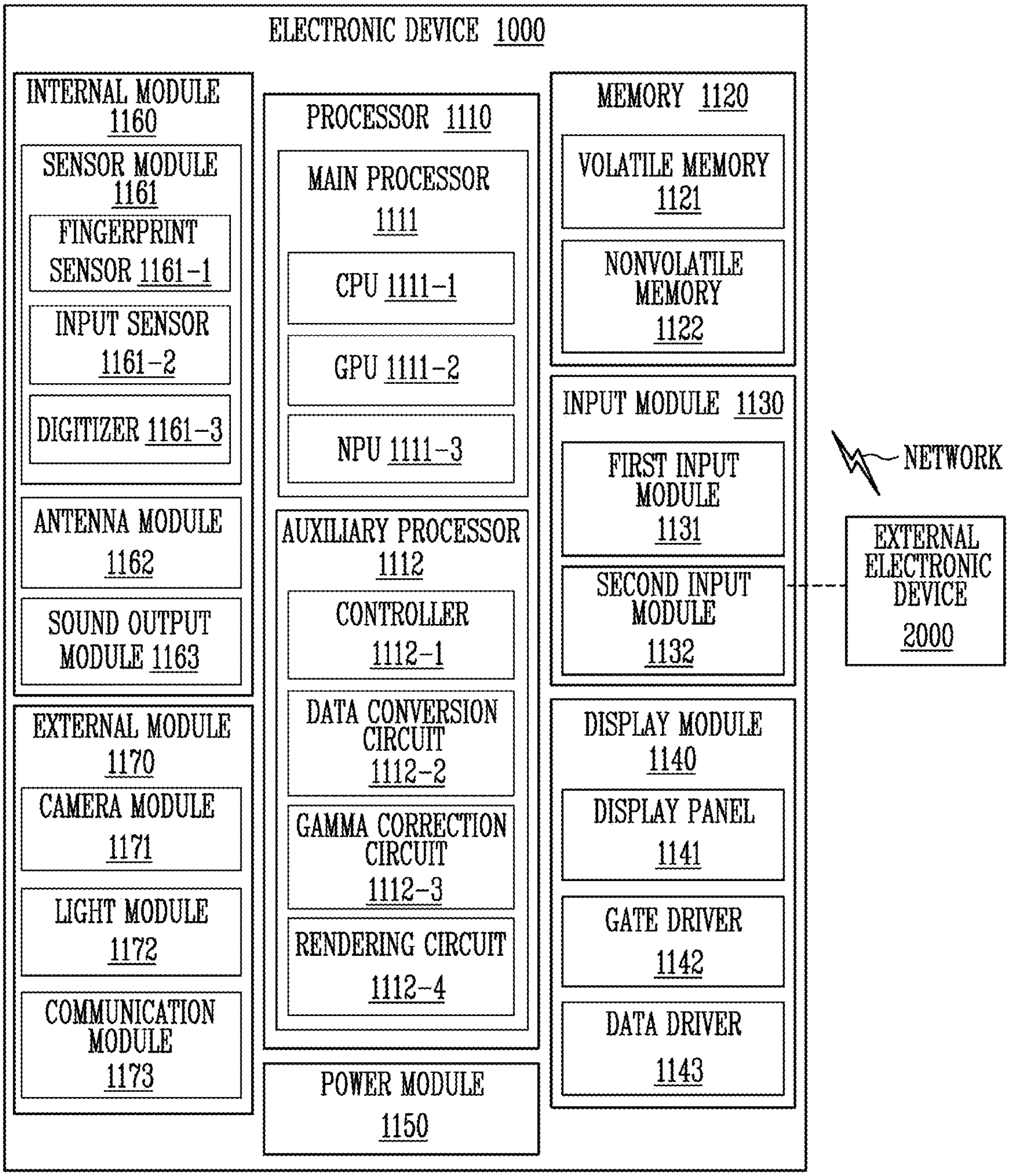
FIG. 28 is a diagram illustrating an electronic device to which a display device according to an embodiment of the disclosure may be applied.

FIG. 28 is a diagram illustrating an electronic device to which a display device according to an embodiment of the disclosure may be applied.

The electronic device 1000 outputs various pieces of information through a display module 1140 within an operating system. The display module 1140 may correspond to at least a portion of the display device 200 of FIG. 1. When a processor 1110 executes an application stored in a memory 1120, the display module 1140 provides application information to a user through a display panel 1141. The processor 1110 may correspond to the host processor 100 and the timing controller 212 of FIG. 2, and the display panel 1141 may correspond to the display panel 220 of FIG. 1.

The processor 1110 obtains an external input through an input module 1130 or a sensor module 1161 and executes an application corresponding to the external input. For example, when the user selects a camera icon displayed on the display panel 1141, the processor 1110 obtains a user input through an input sensor 1161-2 and activates a camera module 1171. The processor 1110 transmits image data corresponding to a captured image obtained through the camera module 1171 to the display module 1140. The display module 1140 may display an image corresponding to the captured image through the display panel 1141.

As another example, when personal information authentication is executed in the display module 1140, a fingerprint sensor 1161-1 obtains input fingerprint information as input data. The processor 1110 compares input data obtained through the fingerprint sensor 1161-1 with authentication data stored in a memory 1120 and executes an application according to a comparison result. The display module 1140 may display information executed according to a logic of the application through the display panel 1141.

As still another example, when a music streaming icon displayed on the display module 1140 is selected, the processor 1110 obtains a user input through the input sensor 1161-2 and activates a music streaming application stored in the memory 1120. When a music execution command is input in the music streaming application, the processor 1110 activates a sound output module 1163 to provide sound information corresponding to the music execution command to the user.

In the above, an operation of the electronic device 1000 is briefly described. Hereinafter, a configuration of the electronic device 1000 is described in detail. Some of configurations of the electronic device 1000 to be described later may be integrated and provided as one configuration, and one configuration may be separated into two or more configurations and provided.

Referring to FIG. 26, the electronic device 1000 may communicate with an external electronic device 2000 through a network (for example, a short-range wireless communication network or a long-range wireless communication network). According to an embodiment, the electronic device 1000 may include a processor 1110, a memory 1120, an input module 1130, a display module 1140, a power module 1150, an internal module 1160, and an external module 1170. According to an embodiment, in the electronic device 1000, at least one of the above-described components may be omitted or one or more other components may be added. According to an embodiment, some of the above-described components (for example, the sensor module 1161, an antenna module 1162, or the sound output module 1163) may be integrated into another component (for example, the display module 1140).

The processor 1110 may execute software to control at least another component (for example, a hardware or software component) of the electronic device 1000 connected to the processor 1110, and perform various data processing or operations. According to an embodiment, as at least a portion of the data processing or operation, the processor 1110 may store a command or data received from another component (for example, the input module 1130, the sensor module 1161, or a communication module 1173) in a volatile memory 1121 and process the command or the data stored in the volatile memory 1121, and result data may be stored in a nonvolatile memory 1122.

The processor 1110 may include a main processor 1111 and an auxiliary processor 1112. The main processor 1111 may correspond to the host processor 100 of FIG. 2, and the auxiliary processor 1112 may correspond to the timing controller 212 of FIG. 2.

The main processor 1111 may include one or more of a central processing unit (CPU) 1111-1 or an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of the above, but is not limited to the above-described example. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

In an embodiment, the main processor 1111 may output an image signal in response to an external input (a user input, or a user command), and vary a refresh rate (a driving frequency, or a frame frequency) of the image signal. For example, the main processor 1111 may vary a driving frequency of the display module 1140 according to the user command. For example, as described with reference to FIGS. 12 to 14, the main processor 1111 may output the image signal (or data) in the active period of the frame period and vary the blank period of the frame period.

The auxiliary processor 1112 may include a controller 1112-1. The controller 1112-1 may include an interface conversion circuit and a timing control circuit. The controller 1112-1 receives an image signal from the main processor 1111, converts a data format of the image signal to correspond to an interface specification with the display module 1140, and outputs image data. The controller 1112-1 may output various control signals used for driving the display module 1140.

The auxiliary processor 1112 may further include a data conversion circuit 1112-2, a gamma correction circuit 1112-3, a rendering circuit 1112-4, and the like. The data conversion circuit 1112-2 may receive the image data from the controller 1112-1, compensate the image data to display an image with a desired luminance according to a characteristic of the electronic device 1000, a setting of the user, or the like, or convert the image data for reduction of power consumption, afterimage compensation, or the like. The gamma correction circuit 1112-3 may convert the image data, a gamma reference voltage, or the like so that the image displayed on the electronic device 1000 has a desired gamma characteristic. The rendering circuit 1112-4 may receive the image data from the controller 1112-1 and render the image data in consideration of a pixel disposition or the like of the display panel 1141 applied to the electronic device 1000. At least one of the data conversion circuit 1112-2, the gamma correction circuit 1112-3, and the rendering circuit 1112-4 may be integrated into another component (for example, the main processor 1111 or the controller 1112-1). At least one of the data conversion circuit 1112-2, the gamma correction circuit 1112-3, and the rendering circuit 1112-4 may be integrated into a data driver 1143 to be described later.

In an embodiment, when the refresh rate of the image signal received from the main processor 1111 is varied, the auxiliary processor 1112 (the controller 1112-1, or the timing control circuit) may receive information on the variation of the refresh rate (or the driving frequency) from the main processor 1111, generate the image data (or the data signal) and the control signal in response to the information, and provide the image data and the control signal to the display module 1140. That is, the auxiliary processor 1112 may control the display module 1114 to operate with a variable frequency by using the image data and the control signal according to the information on the variation of the refresh rate.

The memory 1120 may store various data used by at least one component (for example, the processor 1110 or the sensor module 1161) of the electronic device 1000, and input data or output data for a command related thereto. The memory 1120 may include at least one of the volatile memory 1121 and the nonvolatile memory 1122.

The input module 1130 may receive a command or data to be used by a component (for example, the processor 1110, the sensor module 1161, or the sound output module 1163) of the electronic device 1000 from an outside (for example, the user or the external electronic device 2000) of the electronic device 1000.

The input module 1130 may include a first input module 1131 to which a command or data is input from the user and a second input module 1132 to which a command or data is input from the external electronic device 2000. The first input module 1131 may include a microphone, a mouse, a keyboard, a key (for example, a button), or a pen (for example, a passive pen or an active pen). The second input module 1132 may support a designated protocol capable of connecting to the external electronic device 2000 by wire or wirelessly. According to an embodiment, the second input module 1132 may include a high definition multimedia interface (HDMI), a universal serial bus (USB) interface, an SD card interface, or an audio interface. The second input module 1132 may include a connector capable of physically connecting to the external electronic device 2000, for example, an HDMI connector, a USB connector, an SD card connector, or an audio connector (for example, a headphone connector).

The display module 1140 visually provides information to the user. The display module 1140 may include a display panel 1141, a scan driver 1142, and a data driver 1143. The scan driver 1142 and the data driver 1143 may correspond to the gate driver 214*b* and the data driver 213*a* of FIG. 6, respectively. The display module 1140 may further include a window, a chassis, and a bracket for protecting the display panel 1141.

The display panel 1141 (or a display) may include a liquid crystal display panel, an organic light emitting display panel, or an inorganic light emitting display panel, and a type of the display panel 1141 is not particularly limited. The display panel 1141 may be a rigid type or a flexible type that may be rolled or folded. The display module 1140 may further include a supporter, a bracket, a heat dissipation member, or the like that supports the display panel 1141.

The scan driver 1142 may be mounted on the display panel 1141 as a driving chip. In addition, the scan driver 1142 may be integrated in the display panel 1141. For example, the scan driver 1142 may include an amorphous silicon TFT gate driver circuit (ASG), a low temperature polycrystalline silicon (LTPS) TFT gate driver circuit, or an oxide semiconductor TFT gate driver circuit (OSG) built in the display panel 1141. The scan driver 1142 receives a control signal from the controller 1112-1 and outputs scan signals to the display panel 1141 in response to the control signal.

The display panel 1141 may further include an emission driver. The emission driver outputs an emission control signal to the display panel 1141 in response to the control signal received from the controller 1112-1. The emission driver may be formed separately from the scan driver 1142 or may be integrated into the scan driver 1142.

The data driver 1143 receives a control signal from the controller 1112-1, converts image data into an analog voltage (for example, a data voltage) in response to the control signal, and then outputs the data voltages to the display panel 1141.

The data driver 1143 may be integrated into another component (for example, the controller 1112-1). A function of the interface conversion circuit and the timing control circuit of the controller 1112-1 described above may be integrated into the data driver 1143.

The display module 1140 may further include an emission driver, a voltage generation circuit, and the like. The voltage generation circuit may output various voltages necessary for driving the display panel 1141.

The power module 1150 supplies power to a component of the electronic device 1000. The power module 1150 may include a battery that charges a power voltage. The battery may include a non-rechargeable primary cell, and a rechargeable secondary cell or fuel cell. The power module 1150 may include a power management integrated circuit (PMIC). The PMIC supplies optimized power to each of the above-described module and a module to be described later. The power module 1150 may include a wireless power transmission/reception member electrically connected to the battery. The wireless power transmission/reception member may include a plurality of antenna radiators of a coil form.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input by a body of the user or an input by a pen among the first input module 1131, and may generate an electrical signal or a data value corresponding to the input. The sensor module 1161 may include at least one of a fingerprint sensor 1161-1, an input sensor 1161-2, and a digitizer 1161-3.

The fingerprint sensor 1161-1 may generate a data value corresponding to a fingerprint of the user. The fingerprint sensor 1161-1 may include any one of an optical type fingerprint sensor or a capacitive type fingerprint sensor.

The input sensor 1161-2 may generate a data value corresponding to coordinate information of the input by the body of the user or the pen. The input sensor 1161-2 generates a capacitance change amount by the input as the data value. The input sensor 1161-2 may sense an input by the passive pen or may transmit/receive data to and from the active pen.

The input sensor 1161-2 may measure a biometric signal such as blood pressure, water, or body fat. For example, when the user touches a sensor layer or a sensing panel with a body part and does not move during a certain time, the input sensor 1161-2 may sense the biometric signal based on a change of an electric field by the body part and output information desired by the user to the display module 1140.

The digitizer 1161-3 may generate a data value corresponding to coordinate information of the input by the pen. The digitizer 1161-3 generates an electromagnetic change amount by the input as the data value. The digitizer 1161-3 may sense the input by the passive pen or may transmit/receive data to and from the active pen.

At least one of the fingerprint sensor 1161-1, the input sensor 1161-2, and the digitizer 1161-3 may be implemented as the sensor layer formed on the display panel 1141 through a continuous process. The fingerprint sensor 1161-1, the input sensor 1161-2, and the digitizer 1161-3 may be disposed above the display panel 1141, and any one of the fingerprint sensor 1161-1, the input sensor 1161-2, and the digitizer 1161-3, for example, the digitizer 1161-3 may be disposed below the display panel 1141.

At least two of the fingerprint sensor 1161-1, the input sensor 1161-2, and the digitizer 1161-3 may be formed to be integrated into one sensing panel through the same process. When at least two of the fingerprint sensor 1161-1, the input sensor 1161-2, and the digitizer 1161-3 are integrated into one sensing panel, the sensing panel may be disposed between the display panel 1141 and a window disposed above the display panel 1141. According to an embodiment, the sensing panel may be disposed on the window, and a position of the sensing panel is not particularly limited.

At least one of the fingerprint sensor 1161-1, the input sensor 1161-2, and the digitizer 1161-3 may be embedded in the display panel 1141. That is, at least one of the fingerprint sensor 1161-1, the input sensor 1161-2, and the digitizer 1161-3 may be simultaneously formed through a process of forming elements (for example, a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting a signal or power to an outside or receiving a signal or power from an outside. According to an embodiment, the communication module 1173 may transmit a signal to an external electronic device or receive a signal from an external electronic device through an antenna suitable for a communication method. An antenna pattern of the antenna module 1162 may be integrated into one configuration (for example, the display panel 1141) of the display module 1140 or the input sensor 1161-2.

The sound output module 1163 is a device for outputting a sound signal to an outside of the electronic device 1000, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 1163 may be integrated into the display module 1140.

The camera module 1171 may capture a still image and a moving image. According to an embodiment, the camera module 1171 may include one or more lenses, an image sensor, or an image signal processor. The camera module 1171 may further include an infrared camera capable of measuring presence or absence of the user, a position of the user, a gaze of the user, and the like.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000 and communication performance through the established communication channel. The communication module 1173 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 1173 may communicate with the external electronic device 2000 through a short-range communication network such as Bluetooth, WiFi direct, or infrared data association (IrDA), or a long-range communication network such as a cellular network, the Internet, or a computer network (for example, LAN or WAN). The above-described various types of communication modules 1173 may be implemented as a single chip or as separate chips.

The input module 1130, the sensor module 1161, the camera module 1171, and the like may be used to control an operation of the display module 1140 in conjunction with the processor 1110.

The processor 1110 outputs a command or data to the display module 1140, the sound output module 1163, the camera module 1171, or the light module 1172 based on input data received from the input module 1130. For example, the processor 1110 may generate image data in response to the input data applied through a mouse, an active pen, or the like and output the image data to the display module 1140, or generate command data in response to the input data and output the command data to the camera module 1171 or the light module 1172. When the input data is not received from the input module 1130 during a certain time, the processor 1110 may convert an operation mode of the electronic device 1000 to a low power mode or a sleep mode to reduce power consumed in the electronic device 1000.

The processor 1110 outputs a command or data to the display module 1140, the sound output module 1163, the camera module 1171, or the light module 1172 based on sensing data received from the sensor module 1161. For example, the processor 1110 may compare authentication data applied by the fingerprint sensor 1161-1 with authentication data stored in the memory 1120 and then execute an application according to a comparison result. The processor 1110 may execute the command based on sensing data sensed by the input sensor 1161-2 or the digitizer 1161-3 or output corresponding image data to the display module 1140. When the sensor module 1161 includes a temperature sensor, the processor 1110 may receive temperature data for a measured temperature from the sensor module 1161 and further perform luminance correction or the like on the image data based on the temperature data.

The processor 1110 may receive measurement data for the presence of the user, the position of the user, the gaze of the user, and the like, from the camera module 1171. The processor 1110 may further perform luminance correction or the like on the image data based on the measurement data. For example, the processor 1110 determining the presence or absence of the user through an input from the camera module 1171 may output image data of which a luminance is corrected through the data conversion circuit 1112-2 or the gamma correction circuit 1112-3 to the display module 1140.

Some of the above-described components may be connected to each other through a communication method between peripheral devices, for example, a bus, general purpose input/output (GPIO), a serial peripheral interface (SPI), a mobile industry processor interface (MIPI), or an ultra path interconnect (UPI) link to exchange a signal (for example, a command or data) with each other. The processor 1110 may communicate with the display module 1140 through a mutually agreed interface, for example, may use any one of the above-described communication methods, and is not limited to the above-described communication method.

The electronic device 1000 according to various embodiments disclosed in the present document may be various types of devices. The electronic device 1000 may include, for example, at least one of a portable communication device (for example, a smartphone), a computer device, a portable multimedia device, a portable medical device, a camera, a wearable device, and a home appliance device. The electronic device 1000 according to an embodiment of the present document is not limited to the above-described devices.

Although the technical spirit of the disclosure has been described in detail in accordance with the above-described embodiments, it should be noted that the above-described embodiments are for the purpose of description and not of limitation. In addition, those skilled in the art may understand that various modifications are possible within the scope of the technical spirit of the disclosure.

The scope of the disclosure is not limited to the details described in the detailed description of the specification. In addition, it is to be construed that all changes or modifications derived from the meaning and scope of the claims and equivalent concepts thereof are included in the scope of the disclosure.

What is claimed is:

1. A driver comprising:

a receiver configured to receive data through a first channel; and a controller configured to receive a first synchronization signal including a periodic signal through a second channel different from the first channel, and output a data signal based on the data and the first synchronization signal, wherein the controller includes a calibration circuit configured to correct an error in the first synchronization signal to generate a second synchronization signal, and wherein the controller outputs the data signal in response to the second synchronization signal.

2. The driver according to claim 1, wherein the driver does not include any memory device for storing the data.

3. The driver according to claim 1, wherein the receiver receives the data through the first channel during a first period and does not receive the data through the first channel during a second period, and wherein the periodic signal toggles in both the first and the second periods.

4. The driver according to claim 1, wherein the first channel includes at least one pair of lines, and the second channel includes a single line.

5. The driver according to claim 1, wherein a clock signal is embedded in the data, and wherein the first synchronization signal is different from the clock signal recovered from the data.

6. The driver according to claim 1, wherein the receiver receives a clock signal through a third channel different from the first and second channels.

7. The driver according to claim 6, wherein the first channel includes at least one pair of lines, wherein the second channel includes a single line, and wherein the third channel includes a pair of lines.

8. The driver according to claim 1, wherein the calibration circuit generates a horizontal synchronization signal by delaying pulses of the first synchronization signal using offsets determined from offset calibration, and wherein the horizontal synchronization signal is included in the second synchronization signal.

9. The driver according to claim 8, wherein the calibration circuit generates a third synchronization signal including one pulse in one horizontal time by removing noise from the first synchronization signal or inserting a pulse through a masking operation using a masking reference signal, and generates the horizontal synchronization signal from the third synchronization signal based on the offsets.

10. The driver according to claim 9, further comprising an oscillator for generating the masking reference signal.

11. The driver according to claim 9, wherein the masking reference signal has a first level in a first period and a second other level in a second other period, and wherein the calibration circuit generates the third synchronization signal by bypassing the first synchronization signal in the first period and by masking the first synchronization signal in the second period.

12. The driver according to claim 9, wherein the calibration circuit generates the third synchronization signal by inserting a pulse at or after an end time point of a period in which a pulse of the first synchronization signal is not generated.

13. The driver according to claim 9, wherein the calibration circuit generates the horizontal synchronization signal by delaying a bypassed pulse among pulses of the third synchronization signal by a first offset and by delaying an inserted pulse among the pulses of the third synchronization signal by a second offset different from the first offset.

14. The driver according to claim 9, wherein the calibration circuit recovers an external vertical synchronization signal and an external horizontal synchronization signal from the data and generates a vertical synchronization signal by synchronizing the external vertical synchronization signal and the horizontal synchronization signal, and wherein the vertical synchronization signal is included in the second synchronization signal.

15. The driver according to claim 14, wherein the calibration circuit sets the offsets based on the external horizontal synchronization signal and the third synchronization signal.

16. The driver according to claim 8, wherein a period of the horizontal synchronization signal is equal to an average period of the first synchronization signal.

17. The driver according to claim 8, wherein a period of the horizontal synchronization signal is different from an average period of the first synchronization signal.

18. A display device comprising:

a display panel including a pixel, and a driver configured to receive data through a first channel, receive a first synchronization signal including a periodic signal through a second channel different from the first channel, and output a data signal to the display panel based on the data and the first synchronization signal, wherein the driver includes a calibration circuit configured to correct an error in the first synchronization signal to generate a second synchronization signal, and wherein the driver outputs the data signal in response to the second synchronization signal.

19. The display device according to claim 18, wherein the pixel comprises:

a light emitting element;

a driving transistor controlling a driving current flowing through the light emitting element in response to a voltage of a gate electrode;

a switching transistor transmitting a data voltage to the gate electrode of the driving transistor; and an emission control transistor connected to the light emitting element in series to control an emission duty of the light emitting element, and wherein the first synchronization signal has a toggled waveform in a frame period in which the switching transistor does not operate and the emission control transistor operates.

20. An electronic device comprising:

a main processor configured to output a first synchronization signal including a periodic signal and data;

an auxiliary processor configured to output a data signal based on the first synchronization signal and the data; and a display configured to display an image corresponding to the data signal, wherein the main processor is configured to set a value of a refresh rate of the image, and wherein the main processor outputs the data or stops an output of the data according to the set value of the refresh rate of the image, and continuously outputs the first synchronization signal having a waveform toggled in an entire frame period including a front porch period of a blank period.

21. A display control method comprising:

receiving, by a receiver of a driver, data through a first channel;

receiving, by a controller of the driver, a first synchronization signal including a periodic signal; and outputting, by the driver, a data signal to a display panel based on the data and the first synchronization signal, wherein the outputting the data signal comprises:

correcting an error in the first synchronization signal to generate a second synchronization signal; and outputting the data signal in response to the second synchronization signal.

22. A method of driving an electronic device comprising:

controlling, by an auxiliary processor, a display to display a first image based on data received from a main processor in a first driving period, and controlling, by the auxiliary processor, the display to display a second image based on the data received in the first driving period and a first synchronization signal received from the main processor in a second driving period, wherein the first synchronization signal has a waveform toggled in an entire frame period including a variable front porch period of a blank period.

23. The method according to claim 22, wherein the controlling the display to display the second image includes controlling the display to display the second image based on the first synchronization signal in response to the first driving period being greater than a reference blank period.

24. A display driving method to be performed in a driver, the method comprising:

receiving a first synchronization signal;

applying at least one of masking, delay, and pulse insertion to the first synchronization signal to generate a second synchronization signal; and outputting a data signal based on the second synchronization signal, wherein the first synchronization signal has a waveform toggled in an entire frame period including a front porch period of a blank period.

* * * * *